United States Patent [19]
Hazenbroek et al.

[11] Patent Number: 5,833,527
[45] Date of Patent: Nov. 10, 1998

[54] POULTRY BREAST FILLETING APPARATUS

[75] Inventors: Jacobus E. Hazenbroek, Klaaswaal; Bastiaan Verrijp; Willem C. Steenbergen, both of Numansdorp; Gerrit Barendregt, Heinenoord; Leo I. van Vark, Puttershoek, all of Netherlands

[73] Assignee: Systemate Holland, B.V., Numansdorp, Netherlands

[21] Appl. No.: 681,309

[22] Filed: Jul. 22, 1996

Related U.S. Application Data

[60] Provisional application No. 60/010,481 Jan. 23, 1996.

[51] Int. Cl.$^6$ .................................................. A22C 21/00
[52] U.S. Cl. .......................... 452/170; 452/165; 452/169
[58] Field of Search .................................... 452/170, 163, 452/165, 169

[56] References Cited

U.S. PATENT DOCUMENTS

| | | | |
|---|---|---|---|
| 4,385,419 | 5/1983 | Cantrell | 452/165 |
| 4,558,490 | 12/1985 | Hazenbroek et al. . | |
| 4,559,672 | 12/1985 | Hazenbroek et al. . | |
| 4,682,386 | 7/1987 | Hazenbroek et al. . | |
| 4,780,930 | 11/1988 | Sparkia | 452/165 |
| 4,893,378 | 1/1990 | Hazenbroek et al. . | |
| 4,993,113 | 2/1991 | Hazenbroek | 452/136 |
| 5,001,812 | 3/1991 | Hazenbroek | 452/135 |
| 5,045,022 | 9/1991 | Hazenbroek | 452/165 |
| 5,045,024 | 9/1991 | Diesing | 452/165 |
| 5,092,815 | 3/1992 | Polkinghorne | 452/179 |
| 5,123,872 | 6/1992 | Tieleman et al. | 452/165 |
| 5,368,520 | 11/1994 | Koch et al. | 452/169 |
| 5,372,539 | 12/1994 | Kunig et al. | 452/136 |
| 5,411,434 | 5/1995 | McGoon et al. | 452/169 |

FOREIGN PATENT DOCUMENTS

401528B1   4/1994   European Pat. Off. .

*Primary Examiner*—Willis Little
*Attorney, Agent, or Firm*—Thomas, Kayden Horstemeyer & Risley

[57] ABSTRACT

Previously eviscerated poultry carcasses are moved in series along a conveyor (26), mounted upon a series of mandrels (33). As the poultry carcasses are moved along their processing path and are mounted on their mandrels (33), the carcasses are automatically engaged by a clamp tool (77) that clamps the poultry carcasses against their mandrels (33) in tight locking engagement to hold the poultry carcasses on their mandrels (33). A series of processing stations (42–50) engage and remove the wings, skin and progressively separate the meat from the skeletal structures of the poultry carcasses as said poultry carcasses are moved along their processing path (27) by the conveyor (26).

10 Claims, 10 Drawing Sheets

POULTRY BREAST FILLETING APPARATUS

CROSS REFERENCE TO RELATED APPLICATION

The present application claims priority under 35 U.S.C. §119(e)(i) to U.S. provisional application Ser. No. 60/010,481, filed Jan. 23, 1996; and is a continuation-in-part of U.S. patent application Ser. No. 08/502,972, filed Jul. 17, 1995.

FIELD OF THE INVENTION

This invention relates to a method and apparatus for processing eviscerated poultry carcasses. In particular, this invention relates to a method and apparatus for automatically separating and removing fillets of meat from the skeletal structures of the breast and adjacent back portions of previously eviscerated poultry carcasses.

BACKGROUND OF THE INVENTION

In the processing of poultry such as chickens, turkeys, and other birds, it has become highly desirable to separate the meat from the skeletal structures of the poultry carcasses so that the meat can be marketed and sold without including the bones therewith. Boneless fillets of poultry meat are increasingly preferred by the consuming public and by restaurants, etc. as the meat can be cooked and served in sandwiches or served in relatively small portions that are easy to cut and eat without requiring the consumer to separate the meat from the bone. Additionally, another significant advantage of separating the bones from the meat of the edible poultry carcasses is that when the meat is later cooked, the bone does not need to be cooked. Not having to cook the bones with the meat saves energy and enables the meat to be cooked more uniformly throughout. Further, if the bones are separated from the meat prior to cooking, the bones conveniently can be saved and processed for other uses such as bone meal, etc.

In the past, the process of filleting poultry parts, such as thighs and breasts, generally was a manual process, requiring workers to strip the meat from the bones of the poultry carcasses by hand. Recently, the stripping of the meat of poultry parts has become automated with the introduction of automated deboning and cutting equipment. For example, U.S. Pat. Nos. 3,672,000, 4,068,350, 4,327,463, 4,893,378, and 5,001,812 all disclose apparatus for deboning poultry thighs and similar products wherein the bones of such products are substantially rectilinear and the meat can be scraped longitudinally off the bone. The skeletal structures of the breasts and related parts of poultry carcasses, however, are of a more complex configuration than the bones of poultry thighs or similar parts, and therefore it has been more difficult to separate the meat from the bones of the skeletal structures of the breasts and related parts of the poultry carcasses. In general, the ribs, keelbone and other bones of the skeletal structure of the breast and related parts of a poultry carcass are more delicate and easily broken than are the poultry thigh bones and thus greater care must be taken when filleting the breasts and adjacent back portions of meat from the skeletal structures of the breasts, etc. of poultry carcasses.

Recently, automated equipment has been developed which operates to remove the meat from the skeletal structures of the breasts and adjacent back portions of poultry carcasses. For example, U.S. Pat. No. 4,682,386 discloses a system by which previously eviscerated poultry carcasses are automatically filleted. The poultry carcasses are mounted on a series of mandrels or carcass carriers and are moved along a processing path where a series of cutting stations engage and remove the meat from the skeletal structures of the breast and back portions of the carcass. A similar poultry breast filleting system is taught in U.S. Pat. No. 5,372,539 and in European Patent No. EPO 401,528,B1 which also shows the use of a pivoting clamping lever to help hold the carcasses to their mandrels. Additionally, U.S. Pat. No. 5,045,022 shows an automated poultry breast filleting system in which poultry carcasses are carried along a processing path along which the meat is separated from the skeletal structures of the poultry carcasses, with the system further including an adjustable cutting means that can be raised into the path of movement of the carcasses to separate the fillets of the carcasses into two portions.

In general, with conventional poultry breast filleting apparatus, the carcasses typically are forced down onto the mandrels or carcass carriers of the apparatus and are held in place by the skeletal structures of the carcass or carcasses being conformed to and fitting about the mandrels in a tight frictional engagement. Often during the cutting and stripping of the fillets of meat from the skeletal structures, however, the skeletal structures can shift or twist and thus tend to become misaligned as the poultry carcasses move through the cutting stations. As a result, the bones of the skeletal structure can be engaged or gouged by the cutting blades of the processing apparatus, creating chips or bone fragments that can become lodged in the breast meat, and the cutting stations will not completely separate and remove the meat from the skeletal structures.

Accordingly, it is seen that a need exists for an automated poultry breast filleting apparatus that can remove fillets of meat from the breasts and adjacent back portions of poultry carcasses with the poultry carcasses stabilized and oriented in a desired alignment for cutting to ensure the substantially complete and accurate removal of the meat from the skeletal structures of the breasts and adjacent back portions of the poultry carcasses.

SUMMARY OF THE INVENTION

Briefly described, the present invention comprises a poultry breast filleting apparatus for automatically removing fillets of meat from the breasts and adjacent back portions of previously eviscerated poultry carcasses of birds. Typically, the wings are left on the carcasses while the legs and thighs of the carcasses are removed prior to processing of the carcasses on the breast filleting apparatus. The filleting apparatus includes a series of mandrels or carcass carriers mounted in spaced series along an endless loop conveyor that conveys the mandrels about a substantially elliptical processing path. Each of the mandrels is a substantially rectangular block formed from nylon or similar material, generally shaped to conform to the interior of the skeletal structure of the poultry carcasses. Each of the mandrels generally includes a base portion, and a body portion pivotally mounted to the base portion and having substantially flat or vertically extending side surfaces, a forwardly projecting first or nose portion, a flat second or rear surface, and a tapered top portion. The poultry carcasses are mounted on the body portions of the mandrels with the breasts of the poultry carcasses engaging and being supported on the top portions of the mandrels, and with the nose portions of the mandrels projecting through the neck openings of the carcasses.

The body portion of each mandrel is pivotally mounted to its base portion so as to be rotatable with respect to its base portion about a vertical pivot axis to enable the orientation of the carcasses to be changed as the carcasses are moved along their processing path. A turning sprocket is mounted to the base portion of each mandrel, and includes a series of radially extending teeth that project outwardly from the sides of the mandrels and are adapted to engage a series of turning protrusions positioned along the processing path of the carcasses. As the teeth of the turning sprocket engage the turning protrusions, the body portion of each mandrel is rotated 180° with respect to its base portion such that each carcass is reoriented so that its neck or tail end is leading as desired as the carcasses are moved along their processing path.

A movable carcass clamp means is mounted to the body portion of each mandrel at the proximal or nose end thereof. The clamp means generally includes a clamp tool having a hooked first end and a second end pivotally attached to a support bar which moves longitudinally to cause the clamp tool to be moved longitudinally and pivoted upwardly. The clamp tool is movable from a lowered nonengaging, unclamped position, into an engaging position in clamping engagement with the breast of a carcass mounted on the mandrel. A clamp actuator is mounted to the base portion of each mandrel and is connected to the movable support bar of the clamp tool of its mandrel for moving the clamp tool between its engaging and nonengaging positions. The clamp actuator includes a rack that extends and is movable through the base and body portions of each mandrel. A cam follower is pivotally mounted to a cam support block mounted to a lower surface of the base portion of each mandrel and includes an internal gear or sprocket. The teeth of the sprocket engage a first toothed portion formed along the movable rack. The cam follower engages a series of cam pins mounted along the processing path, causing the cam follower and its sprocket to rotate, which causes the movable rack to move vertically through the body and base portion of each mandrel.

A second toothed portion is formed in the rack adjacent the upper end of the rack, and is engaged by a gear assembly that in turn engages the movable support bar for each clamp tool. As the rack of each mandrel is moved vertically with the rotation of the cam follower of each mandrel, the gear assembly is caused to rotate so as to move the movable support bar, and thus move the clamp tool between its engaging position in clamping engagement with the breast of a poultry carcass mounted on the mandrel, and its lowered, nonengaging position to enable the skeletal structure of a filleted poultry carcass to be removed from each mandrel.

After being loaded on the mandrels, the poultry carcasses are moved along the upper run of the processing path toward a first processing station. Immediately prior to reaching the first processing station, the cam follower of the cam actuator means of each mandrel engages a first pair of cam pins mounted along the processing path, causing the cam follower to rotate to cause the clamp tool of each mandrel to move into its engaging position in clamping engagement with the breast of the poultry carcass mounted on each mandrel. Thereafter, the turning sprocket of each mandrel engages a first series of turning projections, which causes each mandrel to rotate 180° so that the tail end of each carcass is presented to and enters the first processing station ahead of the neck opening of each poultry carcass.

The first processing station comprises a wing cutter that includes a series of movable wing cutting blade assemblies arranged in three pairs positioned progressively along the length of the conveyor, with the cutting blade assemblies of each pair being positioned on opposite sides of the processing path. Each cutting blade assembly includes a cutting blade that extends vertically at an angle with respect to the processing path and which is mounted to a movable support arm. The pivoting support arms for the cutting blades pivot and move their cutting blades inwardly toward the mandrels into a cutting position for engaging and cutting into the poultry carcasses as the mandrels move through the wing cutter. The cutting blades of each successive cutting blade assembly are mounted at successively increasing elevations so as to cut progressively deeper about the shoulder joints between the wings and shoulders of the poultry carcasses through the backsides of the shoulder joints. In between each cut, the wings are urged or rolled further toward the necks of the carcasses to further open the shoulder joints and stretch the connecting tendons, ligaments and leaders thereat for cutting. The cutting blades cut about the wing bones of the shoulder joints to sever the tendons, ligaments and leaders connecting the wings to the shoulders of the poultry carcasses along the top portions of the shoulders while retaining a maximum amount of meat from about the shoulder joints with the breasts.

After the wings of the poultry carcasses initially have been cut in the first wing cutting station, the poultry carcasses are inverted as the mandrels move toward the lower run of the processing path. As the mandrels begin to move along the lower run of the processing path, the poultry carcasses are moved into engagement with a second processing station. The second processing station generally comprises a wing remover having a pair of rotary disc cutting blades mounted in the processing path of the poultry carcasses in a position to engage and cut through the shoulder joints between the wings and shoulders of the poultry carcasses. Pairs of guide rods are mounted on each side of the processing path, extending inwardly and longitudinally along the processing path toward the rotary disc cutting blades.

The wings are received between the guide rods, which cause the wings to be spread upwardly and outwardly to open and align the shoulder joints of the carcasses with the rotary disc cutting blades. Pivotable carcass support plates are positioned on opposite sides of the processing path, arranged above and slightly in front of the rotary disc cutting blades. The carcass support plates are pivoted inwardly so as to engage and press the sides of the poultry carcasses tightly against the side surfaces of the body portions of the mandrels as the wings are urged outwardly and upwardly by the guide rods to ensure that the opened shoulder joints between the wings and shoulders of the poultry carcasses are aligned with the rotary disc cutting blades, which cut through the shoulder joints between the wings and shoulders of the poultry carcasses to complete the removal of the wings therefrom.

Following the removal of the wings from the poultry carcasses, the poultry carcasses proceed along the lower run of the processing path, with their tail ends leading, toward engagement with a third and a fourth processing station. The third processing station comprises a skinner that engages and removes the skin from the poultry carcasses. The skinner includes a pair of large skinning rolls each having a series of helical teeth. The skinner is pivotally mounted to the supporting framework of the breast filleting apparatus so as to be tiltable about a horizontal axis with respect to the processing path. The skinner is connected via a linkage arm to a cam follower that engages and rolls about a cam track formed on an outwardly facing side surface of a first one of the idler sprockets of the conveyor at the proximal end of the breast filleting apparatus. As the cam follower rolls along its cam track, it pulls or urges the linkage longitudinally with respect to the processing path. The skinner in turn is caused to tilt toward and away from the processing path in timed relation with the movement of the poultry carcasses therealong. As the poultry carcasses move through the skinner, the skinner is tilted upwardly toward the poultry carcasses to maintain the skinning rolls in tight contact with the poultry carcasses to ensure that the skin thereof is substantially completely collected and wiped from the poultry carcasses.

The poultry carcasses pass from the skinner to the fourth processing station which comprises a membrane remover station at which the membrane or second skin of the poultry carcasses, which generally extends along the keel bones of the poultry carcasses, is removed from the poultry carcasses. The membrane remover includes a pair of small, toothed membrane remover rolls, and is pivotally attached to the supporting framework of the breast filleting apparatus. The membrane remover is connected via a cam linkage to a cam follower that engages and rolls along a cam track formed along an outer surface of a second idler sprocket mounted adjacent the first sprocket at the proximal end the breast filleting apparatus. In similar fashion to the skinner, the membrane remover is tiltable with respect to the processing path in timed relation with the movement of the poultry carcasses therealong to maintain the remover rolls in contact with the carcasses as its cam roller rolls along its cam track formed along the second idler sprocket. The membrane or second skin of the poultry carcasses is engaged and pulled between the rotating remover rolls so as to strip the membranes from the poultry carcasses prior to the cutting, filleting and removal of the breast and back meat from the skeletal structures of the poultry carcasses.

As the poultry carcasses continue along their processing path toward the remaining processing stations, the turning sprockets of the mandrels, and thus the poultry carcasses, are rotated 180° so that the poultry carcasses are reoriented with their neck portions facing forwardly along the processing path. Immediately prior to entering the fifth processing station, the poultry carcasses engage a pair of stationary cutting blades positioned on opposite sides of the processing path. The cutting blades cut into the meat of the poultry carcasses to separate the scapular meat from the shoulders of the poultry carcasses. Thereafter, the poultry carcasses are carried into a wishbone cutting assembly.

The wishbone cutting assembly includes an axle rotatably mounted to the framework of the breast filleting apparatus, a support bracket mounted to the axle so as to be pivotable with the rotation of the axle, and a slotted support block mounted to the bracket. A wishbone guideblock is attached to the support bracket by an L-shaped support arm pivotally mounted at one end to the support bracket. The wishbone guideblock has a pointed front end having tapering top and side surfaces, with the top surfaces having a recess formed therein for receiving the and guiding the wishbone along the guideblock. A pair of cutting blades are positioned adjacent the tapering side surfaces of the wishbone guideblock, and are angled toward the processing path of the poultry carcasses. The cutting blades move inwardly and downwardly along the tapering side surfaces of the guideblock as the poultry carcasses pass over the guideblock to cut into the meat of the poultry carcasses adjacent the wishbones of the poultry carcasses to separate the meat of the breast and back portions of the poultry carcasses from the wishbones.

A cam wheel is mounted above the wishbone cutting assembly and includes a first cam track formed along a first side thereof and a second cam track formed along the opposite or second side thereof, with the first and second cam tracks being slightly out of phase with one another. Cam followers engage and roll along the cam tracks, with the cam follower rolling along the first or outer cam track causing the pivoting of the entire wishbone cutting assembly toward and away from the processing path, and with the movement of the cam follower along the second cam track causing the movement of the guideblock downwardly and away from the poultry carcasses as the cutting blades engage and cut into the poultry carcasses.

The mandrels thereafter enter a sixth processing station in which the poultry carcasses are engaged by a middle block assembly that cuts along the lower ribs of the skeletal structure of the poultry carcasses. The middle block assembly generally includes a spring biased slotted plow blade that is pivoted into engagement with the carcasses in timed relation with the movement of the mandrels along the conveyor means. The plow blade cuts into the poultry carcasses adjacent the middle of the poultry carcasses and begins the separation of the breast meat from the skeletal structure of the poultry carcasses opening and splaying the meat outwardly from the skeletal structures of the poultry carcasses. Immediately downstream from the middle block assembly is a seventh cutting station, comprising a fillet tunnel assembly positioned in the path of movement of the poultry carcasses along their processing path. The fillet tunnel assembly includes a pair of curved tunnel blades that are pivotable into a position in the processing path of the poultry carcasses. The tunnel blades engage the poultry carcasses, cutting through the meat of the poultry carcasses along the rib cages of the skeletal structures thereof so as to complete the removal of the breast and adjacent back meat from the clavicles and ribs of the skeletal structures of the poultry carcasses.

With the meat substantially cut away from the skeletal structures of the poultry carcasses, the poultry carcasses thereafter are carried into engagement with a fillet removing means. The fillet removing means generally includes a pair of fillet remover gears, positioned parallel to and spaced from one another straddling the center of the processing path so that the keel bones of the poultry carcasses pass between the teeth thereof. A remover roll is positioned below and slightly upstream from the fillet remover gears. The remover roll tends to engage and pull the meat of the poultry carcasses rearwardly and away from the skeletal structures with the portion of the breast meat of the poultry carcasses that remains attached to the keel bones of the poultry carcasses being engaged and peeled away from the keel bone by the rotating fillet remover gears. The fillets of meat tend to drop away for collection as the mandrels continue along their processing path.

Thereafter, the cam wheels of the mandrels engage a second set of cam pins, which cause the cam followers of the mandrels to be rotated approximately ninety degrees. In response, the clamp tools of the mandrels are pivoted and moved into their non-engaging, unclamped position to enable the skeletal structures of the poultry carcasses to be dislodged from the mandrels. As the mandrels continue forwardly, the modules pass between a pair of stripper plates that engage and urge the skeletal structures downwardly and off of the mandrels.

It therefore is an object of this invention to provide an automated poultry breast filleting apparatus for removing fillets of meat rapidly and reliably from the skeletal structures of poultry carcasses.

Another object of this invention is to provide an automated filleting apparatus in which fillets of meat automatically are removed from the skeletal structures of the breasts and adjacent back portions of poultry carcasses, including a means for automatically clamping and holding poultry carcasses against their mandrels to ensure accurate and substantially complete separation of the fillets of meat from the skeletal structures of the poultry carcasses.

Another object of this invention is to provide an automated apparatus for removing the wings and skin of poultry carcasses and thereafter filleting and removing the meat from the breasts and adjacent back portions of the poultry carcasses are moved about a processing path.

A further object of this invention is to provide an automated poultry breast filleting apparatus in which the skin and membranes of previously eviscerated poultry carcasses are removed by a skinner and membrane remover, each of which is tiltable toward and away from the processing path of the poultry carcasses to ensure that the skinner and membrane remover are maintained in tight engagement with the skin and membranes of the poultry carcasses passing therethrough.

Still another object of this invention is to provide an automatic processing apparatus in which previously eviscerated poultry carcasses are moved along a processing path through a series of processing stations in which the meat of the poultry carcasses is progressively and accurately separated from the skeletal structures of the poultry carcasses to ensure the accurate and substantially complete removal of the meat of the breasts and adjacent back portions of the poultry carcasses from the skeletal structures thereof.

Another object of this invention is to provide an automated apparatus in which previously eviscerated poultry carcasses are moved along a processing path through a series of processing stations and are rotated at desired intervals along the processing path so as to reorient the poultry carcasses with their tail or neck ends leading as the poultry carcasses pass through various processing stations.

Another object of this invention is to provide an automated poultry breast filleting apparatus having a mandrel in which previously eviscerated poultry carcasses are received and held in a clamped, secure arrangement and which is rotatable as the mandrels move along a processing path for the poultry carcasses to reorient the poultry carcasses as needed.

Other objects, features and advantages of this invention will become apparent upon reading the following specification, when taken in conjunction with the accompanying drawings.

DETAILED DESCRIPTION OF THE PREFERRED EMBODIMENT

Figure 1:
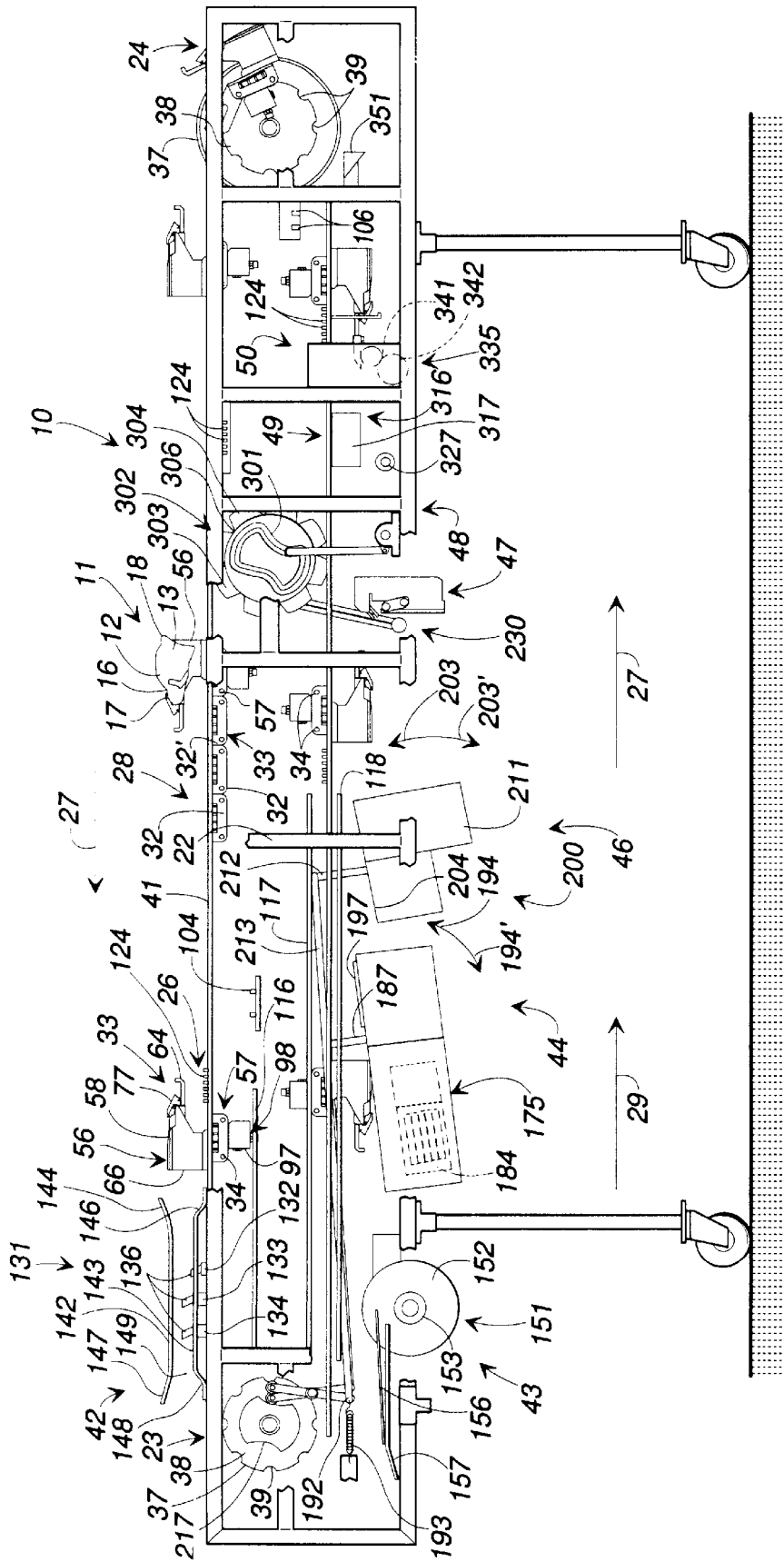
FIG. 1 is a side elevational view schematically illustrating the poultry breast filleting apparatus.

Referring now in greater detailed to the drawings in which like numerals indicate like parts throughout the several views, FIG. 1 illustrates the breast filleting apparatus 10 for removing fillets of meet from poultry carcasses 11. As shown in FIGS. 1–12C, each of the poultry carcasses includes breast portions 12 and adjacent back portions 13, with a keel or breast bone 14 (shown in dashed lines in FIG. 2C) extending approximately along the center of the breast portions of the carcasses, wings 16, shoulders 17, a tail end 18 (FIGS. 2A and 2B), and a neck opening 19. Typically, the carcasses previously will have been eviscerated with their necks, legs, and thighs having been removed. The poultry carcasses further include a skeletal structure (not shown), including the keel bone and a series of outwardly curving ribs and the clavicles or wishbones 21 (shown in dashed lines in FIG. 2C) of the carcasses attached thereto, and an internal visceral cavity extending from the tail end to the neck opening of each carcass.

As shown in FIG. 1, the breast filleting apparatus 10 generally is a stand-alone processing apparatus having a framework 22 with a proximal end 23 and a distal end 24. The framework supports an endless loop conveyor 26 that extends along the length of the framework along a processing path 27. The processing path 27 extends elliptically about the framework and includes an upper run 28 and a lower run 29. A loading area 31 is formed along the upper run 28 of the processing path. The conveyor 26 is formed from a series of spacer blocks 32 and a plurality of mandrels or carcass carriers 33 connected thereto at spaced intervals along the conveyor. The spacer blocks 32 generally are substantially rectangularly shaped blocks formed from nylon or similar durable material, and are hingedly connected in series. Pairs of pusher pins 34 (FIGS. 2A–2C) are mounted along the side surfaces of the spacer blocks and mandrels, and longitudinally extending grooves or slots 36 are formed along the side surfaces of the mandrels and spacer blocks.

Pairs of conveyor sprockets 37 and 38 (FIGS. 1 and 3) are rotatably mounted to the framework at the proximal and distal ends 23 and 24 thereof. Each conveyor sprocket generally is a substantially circularly shaped wheel or disc having a series of spaced recesses 39 formed about its circumference. The conveyor 26 encircles and passes between the conveyor sprockets 37 and 38 with the pusher pins 34 mounted to the spacer blocks 32 and mandrels 33 received within and engaging the recesses 39 of the conveyor sprockets. A drive means such as an electric motor (not shown) is connected to the conveyor sprockets at the distal end of the apparatus for driving the conveyor sprockets, which in turn drives the conveyor 26 to move the mandrels with poultry carcasses 11 mounted thereon about the substantially elliptical processing path 27.

Additionally, pairs of guide rails 41 are mounted to the framework 22, positioned adjacent and extending parallel to the upper lower runs 28 and 29 of the conveyor. As the spacer blocks 32 and mandrels 33 move along the upper and lower runs of the conveyor, the spacer blocks and mandrels tend to engage and ride along the guide rails with the guide rails received in the grooves 36 of the spacer blocks and the mandrels. The guide rails thus tend to stabilize the mandrels and spacer blocks of the conveyor as the mandrels move along their processing path, through a series of processing stations 42–50 positioned at spaced intervals along the processing path as shown in FIG. 1.

Figure 2A:
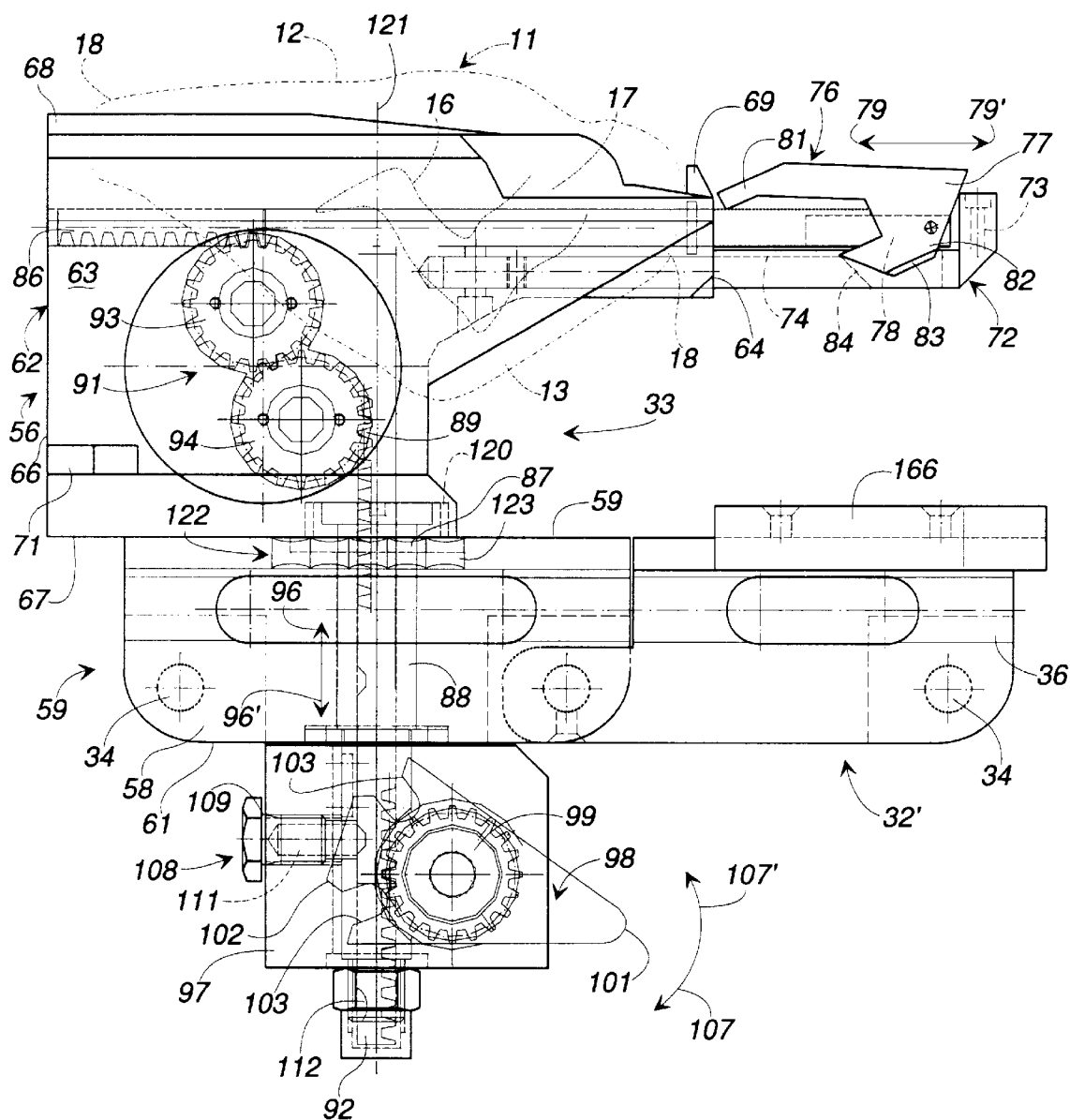
FIG. 2A is a side elevational view of a mandrel with a poultry carcass mounted thereto and showing the clamp tool in a nonengaging position.
Figure 2B:
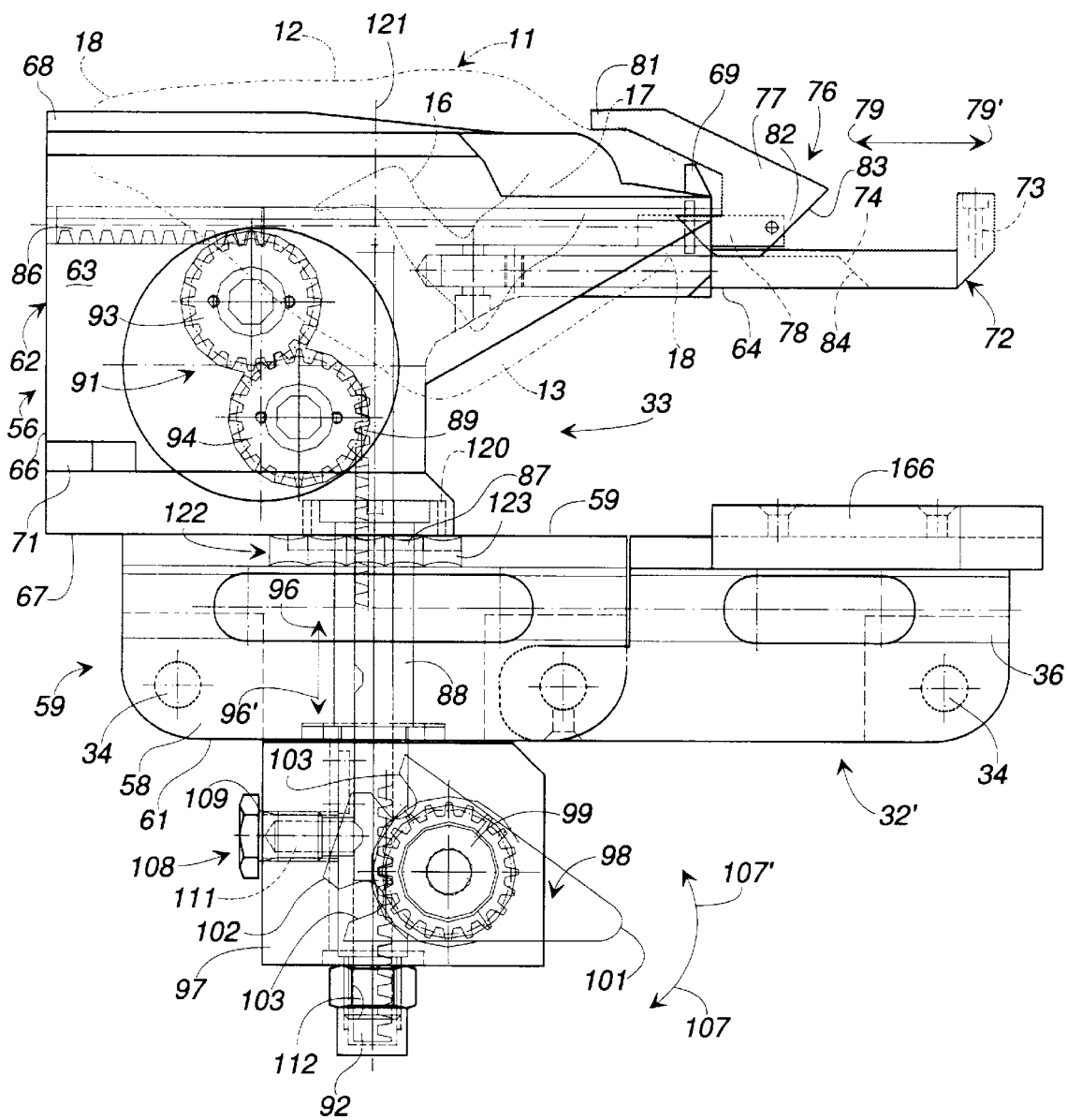
FIG. 2B is a side elevational view of a mandrel with a poultry carcass mounted thereto and showing the clamp tool in an engaged, clamping position.
Figure 2C:
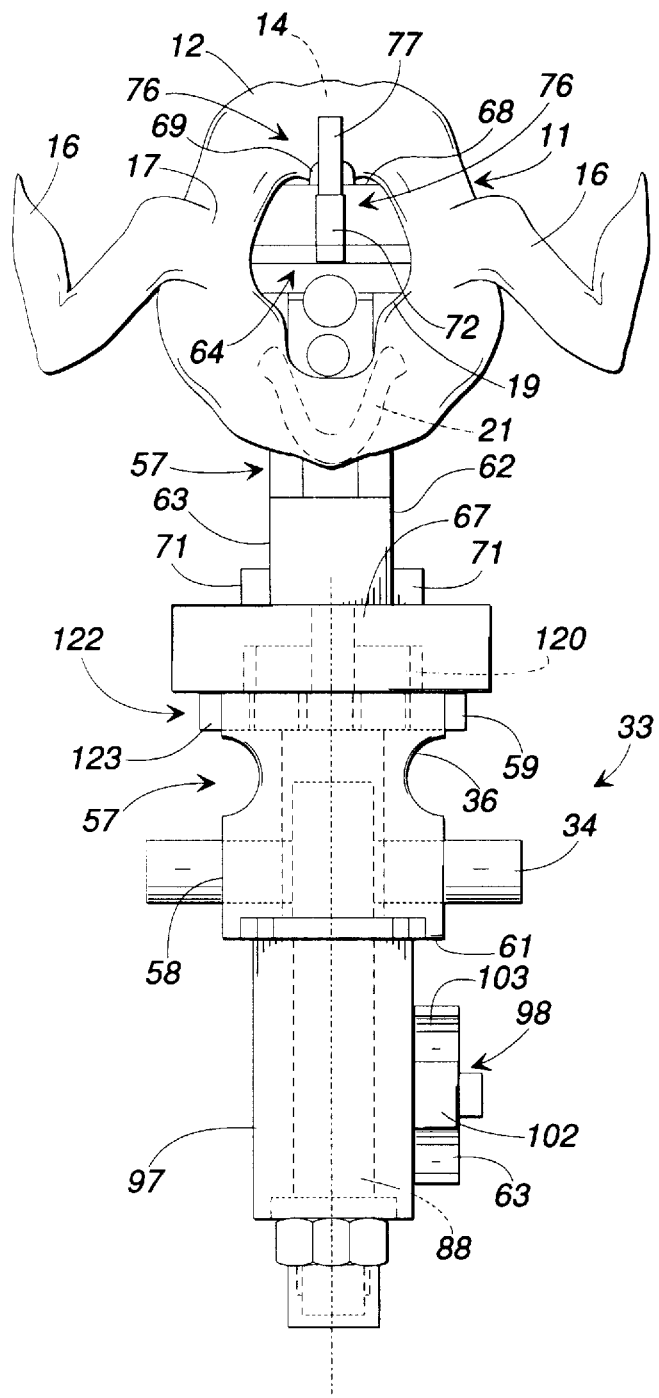
FIG. 2C is a front end view of a mandrel with a poultry carcass mounted thereto and showing the engagement of the clamp tool with the keel bone of a poultry carcass.

As shown in FIGS. 2A–2C, each mandrel or carcass carrier 33 generally is formed from nylon or similar material and is configured so as to approximately correspond to the shape of inner cavity of the skeletal structure of each poultry carcasses to enable the carcasses to be received and fitted thereover. Each of the mandrels includes a base portion 56 and a body portion 57. The base portions include substantially flat sides 58 in which the recesses 39 for guide rods 41 are formed, a substantially flat upper surface 59 and a lower surface 61. The body portion of each mandrel is pivotally attached to its base portion 56 and generally includes substantially flat vertically extending sides 62 and 63, a first or nose portion 64 (FIGS. 2A and 2B) a second or rear portion 66, a bottom surface 67 adjacent the upper surface 59 of base portion 56, and a tapered top portion 68. As FIGS. 2A and 2B illustrate, the poultry carcasses 11 are received on the body portions of the mandrels with the breasts 12 of the carcasses facing upwardly and being supported on the top portions 68 of the body portions, and with the body portions of the mandrels being received within the visceral cavities of the carcasses with the first or nose portions 64 projecting through the neck openings 19 of the carcasses. An upstanding tooth or projection 69 is formed along the upper surface of the nose end of each body portion of each mandrel serves as a stop against which the neck portions of the carcasses engage and are held for proper positioning of the carcasses on the mandrels. Additionally, small cams 71 are mounted to the sides of each mandrel, adjacent the rear and bottom portions thereof.

As FIGS. 2A and 2B illustrate, the nose portion 64 of each mandrel includes a longitudinally projecting guide bar 72 having a hooked end 73 and a slot 74 formed between the hooked end 73 and the body portion of each mandrel. A movable carcass clamp means 76 is mounted to the body portion of each mandrel, received and slidable along the slot 74 of each guide bar 72. The clamp means generally includes a sloped or hooked clamp tool 77 pivotally mounted to a sliding support bar 78 so as to be movable in the direction of arrows 79 and 79'. The clamp tool 77 has a bifurcated, hooked first end 81, and a second end 82 that is pivotally attached to the support bar 78 and has a sloped cam surface 83 that engages a cam surface 84 formed along the slot 74 of the guide bar 72 so as to pivot the first end 81 of the clamp tool upwardly as the clamp tool is moved in the direction of arrow 79 toward the poultry carcass. The sliding support bar 78 includes a toothed portion 86 at its end opposite the clamp tool, which toothed portion engages a clamp actuator means 87 for moving the sliding support bar.

The clamp actuator means 87 generally includes a vertically extending rack 88 that is movably mounted to and extends through the base portion 56 and body portion 57 of each mandrel 33. The rack generally is a rod or bar having an upper or first toothed portion 89 that engages a gear assembly 91 mounted within the body portion of each mandrel, and a second or lower toothed portion 92 formed at the lower end of the rack adjacent the lower or bottom surface 61 of each base portion 56. The gear assembly 91 includes a pair of toothed sprockets or gears 93 and 94 rotatably mounted within the body portion of each mandrel in meshing engagement with one another. The teeth of the upper sprocket 93 further engage the toothed portion 86 of a sliding support bar 78, while the teeth of sprocket 94 further engage the first toothed portion 89 of the rack 88. As the rack is moved vertically through the base and body portions of the mandrels, in the direction of the arrows 96 and 96', the first toothed portion 89 of the rack 88 engages and causes the rotation of sprocket 94, which in turn causes the rotation of sprocket 93. Sprocket 93 engages and urges the sliding support bar 78 in the direction of arrows 79 and 79' to move the clamp tool 77 between an unclamped nonengaging position, shown in FIG. 2A, to an engaging, position in clamping engagement with the breast of the poultry carcasses for securing the poultry carcasses against the mandrels as illustrated in FIG. 2B.

As illustrated in FIGS. 2A and 2B, a cam support block 97 is mounted to the lower or bottom surface 61 of the base portion 67 of each mandrel 33. As with the base and body portions of the mandrels, the cam support block generally is formed from nylon or similar plastic material and slidably receives the lower end of the rack 88 therein. A cam follower 98 is rotatably mounted to the cam support block 97, attached to a gear or sprocket 99 mounted within the cam support block. The cam follower is substantially V-shaped, generally being formed from a hard plastic material, and has a pointed first end 101, and a substantially flat second end 102 in which is formed a pair of cylindrical slots or recesses 103.

As shown in FIG. 1, pairs of cam pins 104 and 106 are positioned along the upper and lower runs of the processing path of the mandrels, with the first set of cam pins 104 being positioned between the loading area 31 and first processing station 42 along the upper run of the processing path, and with the second set of cam pins 106 being positioned along the lower run 19 of the processing path between the final processing station 50 and the sprockets 37 and 38 at the distal end of the breast filleting apparatus 10. The cam pins are received within the recesses 103 (FIGS. A and 2B) of the cam followers 98 and cause the cam followers to be rotated in the direction of arrows 107 and 107' to cause the sliding movement of the clamp tool 77 into clamping engagement with the poultry carcasses at the start of a processing operation and out of clamping engagement with the skeletal structures of the processed poultry carcasses at the end of a processing operation.

A locking assembly 108 is mounted within the cam support block 97 and engages the rack 88 for locking the rack, and thus the clamp tool, in its clamped engaging and unclamped, nonengaging positions. The locking assembly 108 generally includes a ball detent 109 having a spring biased ball 111 that is biased inwardly toward the rack 88, and with the rack 88 having a pair of detent recesses 112 formed in its rear side surface, aligned approximately with the ends of the second toothed portion 92 of the rack. As the rack is moved in the direction of arrows 96 and 96' the detents 112 of the rack are engaged by the spring biased ball 111 of the ball detent assembly 109 to lock the rack against further movement, and thus lock the clamp tool in its engaging position or its unclamped, nonengaging position, until the cam follower again is engaged by a set of cam pins 104 or 106 (FIG. 1) with sufficient force to overcome the spring bias of the ball.

In addition, as FIG. 1 illustrates, stabilizer bars 116 and 117 are mounted to the framework 22 of the breast filleting apparatus, positioned along the upper and lower runs respectively of the processing path 17. The stabilizer bars generally are elongated bars formed from steel or similar material that are positioned at an elevation sufficient to engage the cam followers. The cam followers slide along the stabilizer bars as the mandrels move along their processing path to maintain the cam followers against rotation as the mandrels are passed through the first, second, third and fourth processing stations to prevent the release of the clamp tool from the poultry carcasses as the poultry carcasses are engaged and processed at the first-fourth processing stations. Guide rails 118 are mounted adjacent and extend partially along the processing path in a position to engage the body portions of the mandrels to prevent rotation of the mandrels as they move through the first through fourth processing stations 42–46.

As indicated in FIG. 1, the body portions 57 of the mandrels 33 are rotatably mounted to their base portions 56 so as to enable the body portions to pivot approximately 180° with respect to their base portions as the mandrels move along their processing path. As illustrated in FIGS. 2A and 2B, a hub 120 is rotatably mounted within a recess formed in the upper surface 59 of each base portion 56 and attaches to the bottom surface 67 of the body portion 57 of each mandrel. The rack 88 of each mandrel extends through the hub 120 and acts as an axle or pivot pin about which the hub, and thus the body portion of each mandrel rotates about a vertically extending pivot axis 121 that extends through the rack. A turning sprocket or gear 122 is mounted to the hub and includes a series of radially projecting gear teeth 123 that project through the sides 58 of the base portions 56 adjacent the upper surfaces 59 thereof.

Figure 3:
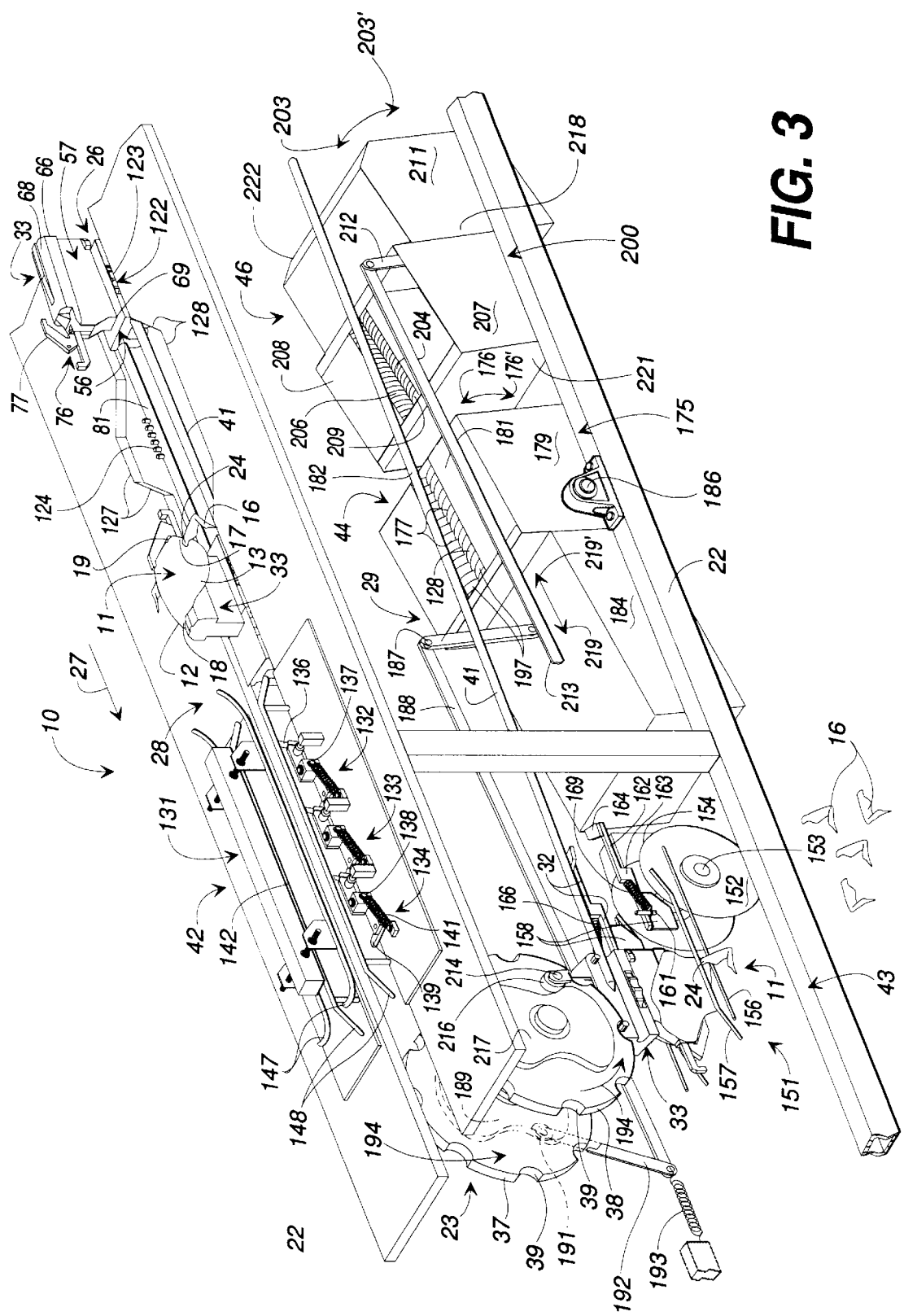
FIG. 3 is a perspective view illustrating the wing cutting stations as a poultry carcass enters each wing cutting station.

A series of turning projections 124 (FIGS. 1 and 3) are mounted to the guide rods 41 in sets positioned at spaced intervals along the upper and lower runs of the processing path 27. The turning projections comprise upstanding pins positioned so as to be engaged by the teeth 123 (FIG. 2C) of the turning sprocket 122 as the mandrels are moved along their processing path, causing the mandrels to be rotated approximately 180° as illustrated in FIGS. 1 and 3 so that the poultry carcasses mounted thereon are reoriented so that their tail ends or neck openings are leading as they enter the various processing stations 42–50 (FIG. 1). Additionally, as FIG. 3 illustrates, a cut-away 126 is formed in the upper shelf of the framework 22 of the breast filleting apparatus between the loading area 31 and first processing station 42. The cut-away is formed approximately above the first set of turning projections 124 and includes angled guide surfaces 127 and 128 formed on opposite sides of the processing path for guiding the bottom portion 67 of each mandrel as each mandrel is rotated.

After each mandrel 33 (FIGS. 1 and 3) has been loaded with a poultry carcass 11, the mandrels are moved along their processing path 27 and are reoriented approximately 180° as the mandrels enter the first processing station 42. The first processing station 42 comprises a wing cutter 131 for initiating the separation of the wings 16 from the poultry carcasses. The wing cutter 131 (FIG. 3) includes a series of pivoting wing cutting blade assemblies 132, 133 and 134 (with only the cutting blade assemblies along one side of the processing path being shown for clarity). The cutting blade assemblies are arranged in three pairs spaced approximately six inches apart along the processing path, with the cutting blade assemblies 132, 133 and 134 of each pair positioned on opposite sides of the processing path. Each cutting blade assembly has substantially the same construction, including an angled, vertically extending cutting blade 136 mounted to a pivoting support arm 137. Each support arm 137 is connected at its opposite end to a pivot block 138 having a cam protrusion 139 mounted thereto and projecting into the processing path 27 of the mandrels 33. The cam protrusions are engaged by the cams 71 attached to the sides of the mandrels, which causes the support arms 137 to pivot about pivot blocks 138 to move each cutting blade 136 into cutting alignment with an oncoming poultry carcass.

When moved into its cutting alignment in the processing path of the carcasses, each cutting blade 136 is positioned on the wing side of each shoulder joint 24. The cutting blades 136 thus become approximately aligned with the knuckles (not shown) of the wing of each knuckle about the radius thereof, with the cutting blades of each successive cutting blade assembly 133 and 134 positioned to cut progressively deeper through the tendons, leaders, etc. between the wings and shoulders. The cutting of the leaders, etc. in multiple cutting operations enables the wings to be further rolled toward the neck portions of the carcasses to enable the removal of the wings from the carcasses with a maximum amount of meat from about the shoulder joints being retained with the breasts 12 of the carcasses 11. A tension spring 141 is attached to each support arm 137 to the frame of the wing cutter 131. The tension springs bias the pivot arms, and thus each cutting blade 136 away from the processing path 27 to move the cutting blades out of engagement with the poultry carcasses after the joints between the wings and shoulders of the birds have been engaged and the tendons, leaders, etc. thereat cut by each cutting blade to avoid engagement of the breast and back meat by the cutting blades.

Additionally, pairs of guide rails 142 and 143 that are positioned adjacent and extend along each side of the processing path 27. The guide rails generally are elongated metal rods having diverging first or front ends 144 and 146 and diverging second or rear ends 147 and 148, and extend parallel to and are vertically spaced from one another to define guide channels 149. The wings 16 are received between and move along the guide rails, which lift and urge the wings toward the neck portions 19 of carcasses 11. As a result, the wings are rolled further toward the neck portions of the carcasses between each cut as the tops of the shoulder joints are further opened and the leaders, etc. are stretched for cutting by the cutting blades 136 as the carcasses are moved through the wing cutter 131.

After the wings 16 have been partially separated from the shoulders 17 of the poultry carcasses 11, the poultry carcasses are moved by the conveyor 26 about the sprockets 37 and 38 at the proximal end 33 of the breast filleting apparatus 10 (FIG. 1). The poultry carcasses thus are inverted so that their breasts now face downwardly and their backs face upwardly as illustrated in FIG. 3, and the carcasses begin to move along the lower run 29 of the processing path 27 toward the second processing station 43, which generally comprises a wing remover 151 mounted to the framework 22 of the breast filleting apparatus.

The wing remover 151 includes a pair of rotary disc cutting blades 152 mounted on a drive shaft 153, connected to a drive motor 154 for rotating the rotary disc cutting blades. The rotary disc cutting blades are positioned in the processing path of the poultry carcasses, spaced from one another a distance sufficient to enable the breasts and backs of the poultry carcasses to pass therebetween the poultry carcasses. Pairs of guide rods 156 and 157 are mounted on each side of the wing remover 151, extending from in front of the rotary disc cutting blades along the processing path, to a point just past the edges of the rotary disc cutting blades, as shown in FIGS. 1 and 3. The guide rods generally are elongated metal rods with the outer guide rods 156 extending substantially straight along the processing path, and with the inner guide rods 157 sloping upwardly and inwardly toward the cutting blades. The wings of the poultry carcasses are engaged between and slide along the guide rods as the poultry carcasses are moved through the wing remover, causing the wings to be urged downwardly and inwardly toward the breasts of the carcasses to open and align the shoulder joints with the rotary disc cutting blades.

In addition, pivotable carcass support plates 158 are mounted on each side of the processing path, positioned slightly in front of and above the rotary disc cutting blades. Each support plate includes a finger or projection 161 that extends downwardly therefrom and which engages the side of the rotary disc cutting blades therebelow to limit the inwardly pivoting movement of the guide plates 158. Each of the guide plates is connected to a pivot arm 162 that pivots about a pivot pin 163, and includes a cam protrusion 164 that extends from the free end of each pivot arm inwardly toward the processing path.

As the mandrels pass through the wing remover, the cam protrusions 164 are engaged by a cam block 166 mounted on each side of each spacer block 32' immediately proceeding each mandrel. The cam blocks 166 include sloped cam surfaces 167 which engage and urge the filleting tools of the various processing stations into actuated positions for cutting the meat of the carcasses. The cam protrusions 164 of the pivot arms 162 are engaged and urged away from the processing path by the cam blocks 166 of the spacer blocks 32' to pivot the guide plates 158 inwardly so as to press the breasts and backs of the poultry carcasses against the sides of the mandrel to ensure that the meat of the breasts and the backs will not come into contact with the rotary disc cutting blades as the mandrels pass therebetween. Tension springs 169 are connected to the guide plates 158 and tend to bias the lower ends of the guide plates outwardly from the processing path and the poultry carcasses once the cam blocks 166 of the spacer blocks 32' are removed from engagement with the cam protrusions 164. As indicated in FIG. 3, the rotary disc cutting blades cut through the opened shoulder joints between the wings 16 and shoulders 17 of the poultry carcasses through the front sides of the shoulder joints to complete the removal of the wings from the poultry carcasses. The separated wings thereafter are permitted to drop through the bottom of the poultry breast filleting apparatus to a collection means such as a conveyor or collection bin.

Figure 4:
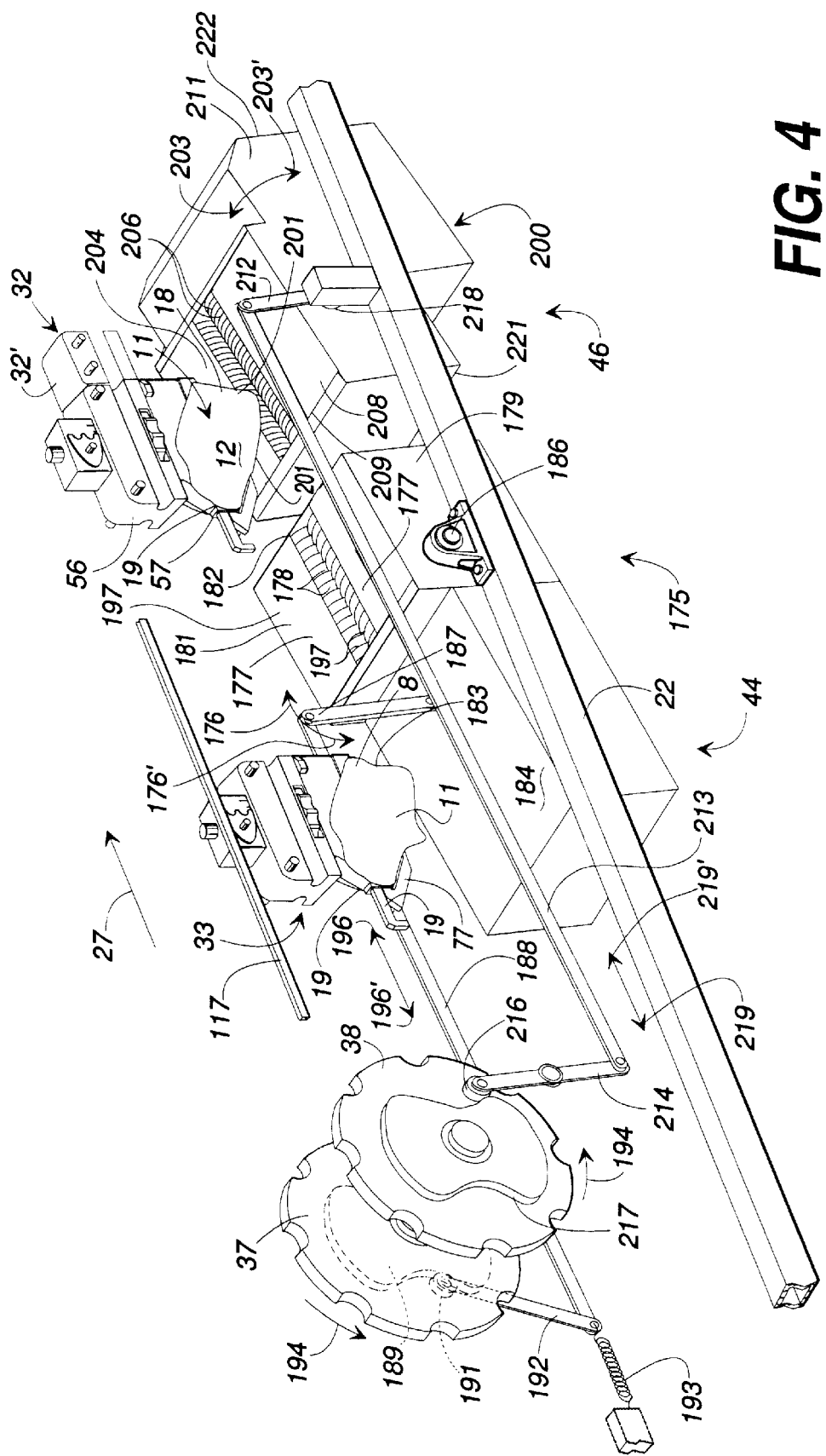
FIG. 4 is a perspective view schematically illustrating the skinner and membrane remover and their cam followers moving along the cam tracks of the idler sprockets at the proximal end of the apparatus.

The third processing station 44, comprising a skinner 175 is pivotally mounted to the framework of the breast filleting apparatus so as to be tiltable in the direction arrows 176 and 176' toward and away from the poultry carcasses as the poultry carcasses move along their processing path past the skinner. The skinner includes a pair of large skinning rolls 177 having a series of helical teeth 178 formed thereabout. The skinning rolls 177 are mounted within a housing 179 having a slotted cover 181 that has an opening 182 extending approximately along the center of the cover to enable the skin 183 of the poultry carcasses 11 to be engaged by the skinning rolls, as shown in FIG. 4. A motor 184 is mounted at the front of the skinner 175, connected to the skinning rolls for rotating the skinning rolls in meshing engagement with one another. As a result, as the poultry carcasses are moved along the slotted opening 182 of the cover 181, the skin of the poultry carcasses is engaged and pulled between the teeth of the rotating skinning rolls which pull the skin downwardly and away from the poultry carcasses. The skin has dropped away from poultry carcasses into a collection means for disposal, etc.

As shown in FIG. 4, the skinner 175 is pivotally mounted to the framework 22 of the breast filleting apparatus by pivot pins 186 positioned approximately at the center of the skinner, between the skinning rolls 177 and motor 184. A crank arm 187 is mounted to the skinner approximately above the pivot pin 186 on the left side of the skinner and is connected to a linkage 188 that extends longitudinally toward the sprocket 37 of the conveyor at the proximal end 23 (FIG. 1) of the breast filleting apparatus 10. As FIG. 4 illustrates, a cam track 189 (shown in dashed lines) is formed along the outwardly facing surface of sprocket 37, generally being formed in a substantially hour glass configuration. A cam roller 191 engages and rolls along the cam track 189 and is connected to a second crank arm 192 that is pivotally mounted to the apparatus framework and is connected at its lower end to the linkage 188. A tension spring 193 also is attached to the lower end of the crank arm 192 and to the framework of the breast filleting apparatus. The tension springs tends to bias the lower end of the crank arm 192 outwardly so as to urge the cam roller 191 attached to the upper end of the crank arm 192 against the cam track 189 to maintain the cam roller in engagement with the cam track as sprocket 37 rotates in the direction of arrow 194 with the movement of the conveyor thereabout.

As the cam roller 191 rolls along its cam track, the crank arm 192 is pivoted so that the linkage 188 is moved longitudinally in the direction of arrows 196 and 196', which in turn causes the crank arm 187 to be moved forwardly and rearwardly to tilt the skinning rolls 177 against the weight of the motor toward and away from the poultry carcasses in timed relationship with the movement of the poultry carcasses along the processing path. Initially, the downstream ends 197 of the skinner rolls are tilted away from the processing path as the poultry carcasses enter the skinner. The skinner rolls are tilted toward the poultry carcasses in timed relation with the forward movement of the poultry carcasses so that the skinning rolls are maintained in tight engagement with the skin of the poultry carcasses to ensure a substantially complete engagement and removal of the skin therefrom.

Immediately downstream from the skinner is the fourth processing station 46, which comprises a membrane remover 200 for removing the thin membrane or second skin 201 clinging to the poultry carcasses along the keel thereof. As with the skinner, the membrane remover 200 is pivotally attached to the framework 22 of the breast filleting apparatus by pivot pins or hinges 202, which enable the membrane remover to be pivoted in the direction of arrows 203 and 203'. The membrane remover includes a pair of remover rolls 204, each having a diameter smaller than that of the skinner rolls. A series of helical teeth 206 are formed along the length of the remover rolls with the teeth of the remover rolls in meshing engagement with one another. The remover rolls 204 are mounted within a housing 207 having a slotted cover 208 with a central opening or slot 209 formed along the length thereof, approximately in the center of the cover so that the intermeshing teeth of the remover rolls are exposed. The membranes of the poultry carcasses are engaged by the intermeshing teeth of the remover rolls as the poultry carcasses are passed thereover. A motor 211 is mounted along the downstream end of the membrane remover 200 and is connected to the remover rolls 204 for rotating the remover rolls.

As shown in FIGS. 3 and 4, a crank arm 212 is mounted to the membrane remover approximately in the center thereof, above the pivot pin 202. The crank arm is connected at its free end to a linkage 213 that extends from the crank arm rearwardly toward sprocket 38 of the conveyor at the distal end 24 (FIGS. 1 and 3) of the apparatus. The linkage 213 (FIG. 4) is connected at its opposite end to a second crank arm 214 that is pivotally mounted to the framework of the breast filleting apparatus and which includes a cam roller 216 mounted to its upper, free end. A cam track 217 is formed approximately in the center of the sprocket 38, having a substantially hour glass shaped design, and is slightly out of phase with the cam track 189 for the skinner 175. Cam roller 216 engages and rolls along the cam track 217 as the sprocket 38 is rotated with the movement of the conveyor thereabout, which causes the crank arm to be pivoted about a pivot pin 218.

As the crank arm 214 is pivoted it pulls or urges the linkage 213 in the direction of arrows 219 and 219', which in turn urges the crank arm 212 forwardly or rearwardly so as to tilt the membrane remover against the weight of its motor toward and away from the processing path of the poultry carcasses. Initially, the foremost or upstream end 221 of the membrane remover is tilted downwardly, away from the processing path to enable the poultry carcasses to enter the membrane remover without interference, and as the poultry carcasses are moved through the membrane remover, the membrane remover is tilted in timed relation with the movement of the carcasses therethrough so that its downstream end 222 is pivoted downwardly away from the poultry carcasses, and thus the remover rolls are maintained in tight scraping engagement with the poultry carcasses to ensure that the membranes or second skins are substantially completely removed therefrom.

As the poultry carcasses continue along their processing path after being skinned, the turning sprockets 122 (FIG. 5) of the mandrels 33 engage a second set of turning projections 124 mounted along the processing path. As the teeth of the turning sprockets engage the turning projections, the mandrels are rotated approximately 180° so that the neck openings and shoulders of the poultry carcasses mounted thereon are reoriented so as to be leading as the poultry carcasses continue their movement along their processing path toward the fifth processing station 47. Immediately prior to entering the processing station 47, the poultry carcasses engage a pair of stationary cutting blades 125 and 126. The stationary cutting blades are generally rectangularly shaped blades mounted to the supporting frame work of the breast filleting apparatus and each have an angled forward cutting edge 227. The cutting blades are positioned on opposite sides of the processing path in alignment with the shoulders of the oncoming poultry carcasses and cut into the meat of the poultry carcasses adjacent the shoulders 17 thereof to separate the scapular meat from the shoulders of the poultry carcasses to begin the filleting of the meat of the poultry carcasses.

Figure 5:
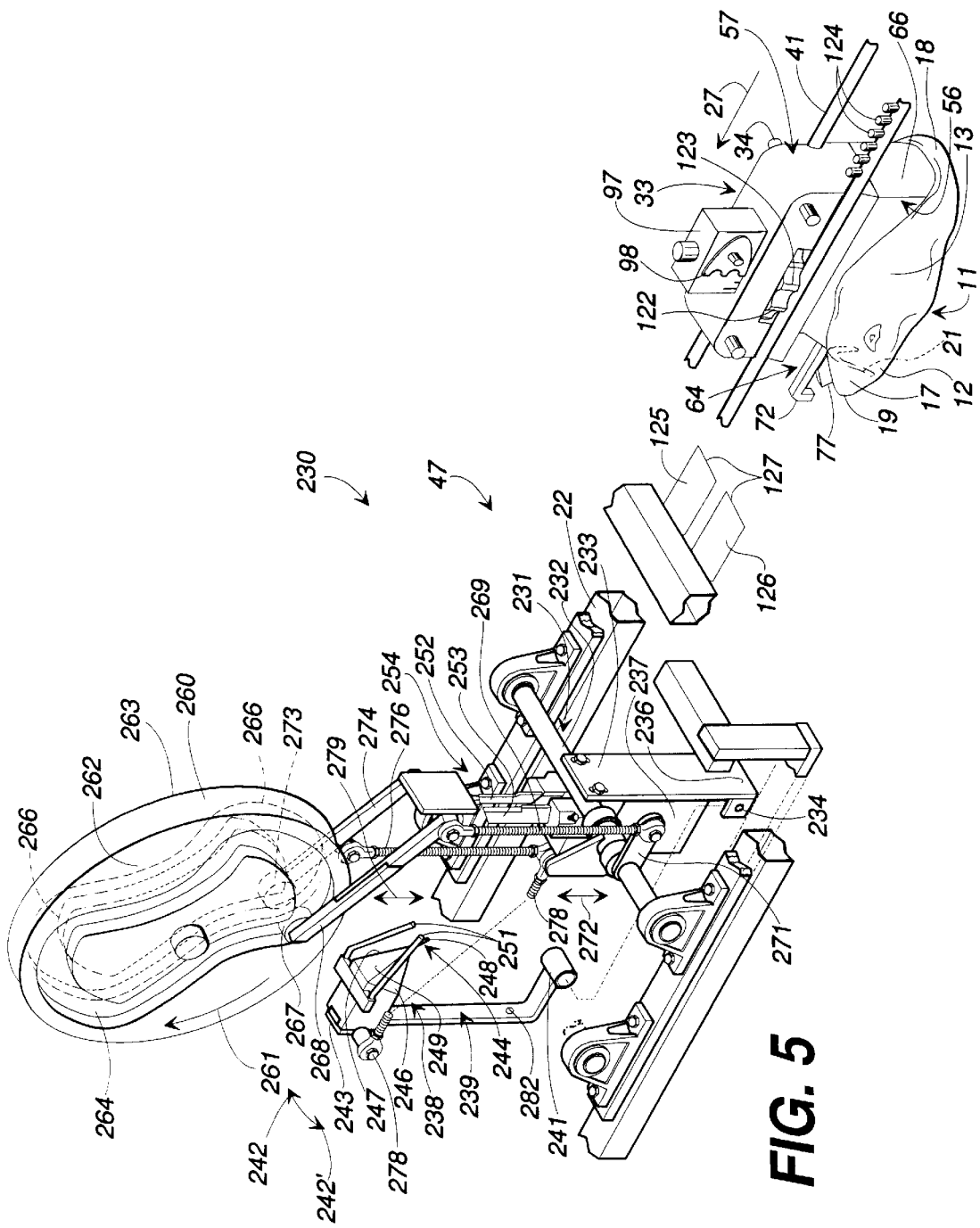
FIG. 5 is a perspective view illustrating the wishbone cutting assembly with parts broken away for clarity.

As FIG. 5 illustrates, the fifth processing station 47 is positioned immediately downstream from the stationary cutting blades 225 and 226 and comprises a wishbone cutting assembly 230. The wishbone cutting assembly includes a frame 231 that includes an axle 232 pivotally mounted to the framework 22 of the breast filleting apparatus. A support bracket 233 is mounted to the axle 232 so as to be pivotable with the rotation of the axle, and has a substantially L-shaped configuration, having a pair of lower arms 234 that extend along the processing path, and a vertically extending portion 236 that is mounted to the axle. A slotted support block 237 is mounted to the downstream side of the vertical portion 236 of the support bracket 233 and includes a vertically extending slot or channel (not shown) formed therein. A wishbone guideblock 238 is pivotally mounted to the frame 231 of the wishbone cutting assembly, mounted on an L-shaped support arm 239 that is pivotally attached at its lower end 241 to the lower arms 234 of the support bracket 233 so as to enable the pivoting movement of the wishbone guideblock in direction of arrows 242 and 242' toward and away from the processing path 27.

The wishbone guideblock generally is formed from a material such as nylon or a similar plastic material and includes a flat rear end 243 mounted to the upper end of the L-shaped support arm 239, and a pointed front end 244 having tapering side and top surfaces 246, 247 and 248. A guide recess 249 is formed in the top surface 248 of the wishbone guideblock for receiving and guiding the wishbones 21 along the top surface of the wishbone guideblock as the poultry carcasses pass thereover in order to maintain the wishbones in a desired alignment for cutting. Additionally, guide rods 251 are mounted adjacent the side surfaces 246 and 247 of the wishbone guideblock for engaging and aligning the sides of the poultry carcasses as the poultry carcasses pass over the top surface of the wishbone guideblock to ensure that the wishbones of the poultry carcasses are properly aligned for cutting.

A pair of cutting blades 252 and 253 are mounted along the processing path of the poultry carcasses, positioned upstream from the wishbone guideblock 238. The cutting blades 252 and 253 extend vertically and are angled toward the processing path being mounted adjacent the side surfaces 246 and 247 of the wishbone guideblock. The cutting blades are mounted to a support yoke 254 that is received within and slides along the support block 237 of the assembly frame 231. Each cutting blade is mounted within a blade carrier 256 mounted to the upper ends of the support yoke 254 and which are spring biased outwardly. As the poultry carcasses move over the wishbone guideblocks, the cutting blades are moved downwardly with the sliding movement of their support yoke through the support bracket 233, which additionally causes the cutting blades being urged inwardly so that the cutting blades move along and adjacent the tapering side surfaces 246 and 247 of the wishbone guideblock 238 as the poultry carcasses pass thereover.

As illustrated in FIG. 5, a cam wheel 260 is mounted above the wishbone guideblock and cutting blades of the wishbone cutting assembly 230, being rotatably mounted to the framework of the breast filleting apparatus so as to rotate in the direction arrows 261 in timed relation with the movement of the mandrels along their processing path. The cam wheel comprises a large sprocket having a first or outer side surface 262 and second or inner side surface 263. A first cam track 264 is formed on the first side surface 262 of the cam wheel, having a substantially hour glass shaped configuration, and a second cam track 266 (shown in dashed lines) is formed in the second side surface 263 of the cam wheel, having a substantially hour glass shaped configuration and being slightly out of phase with the first cam track 264.

A first cam roller 267 engages and rolls along the first cam track as the cam wheel is rotated in the direction of arrow 261, with the first cam roller being mounted to one end of a crank arm 268, which is attached at its opposite end to a linkage 269. The linkage extends substantially vertically and is attached to a bracket 271 mounted to the axle 232 of the assembly frame 231. As the first cam roller 267 rolls along its first cam track 264, the crank arm 268 is pivoted so that the linkage 269 is urged vertically in the direction of arrows 272 and 272' to cause the rotation of the axle and thus the entire assembly frame 231 of the wishbone cutting assembly 230. A second cam roller 273 (shown in dashed lines) engages and rolls along the second cam track 266 of the cam wheel 260 and is attached to one end of a crank arm 274 that is pivotally attached to the frame work of the breast filleting apparatus. The crank arm 274 is connected at its opposite end to a linkage 276 that extends downwardly and is attached at its lower end to a pivot plate 277 that is rotatably mounted to the axle 232 so as to be pivotable independently of the rotation of the axle.

A small connector arm 278 is attached to the pivot bracket below the linkage, and attaches at its opposite end to the upper end of the L-shaped support arm 239 adjacent the rear end 243 of the wishbone guideblock 238. As the second cam roller 273 rolls along the second cam track 266 in response to the movement of the poultry carcasses through the wishbone cutting assembly, linkage 276 is moved vertically in the direction of arrows 279 and 279' which causes the pivot plate 277 to rotate or pivot about the axle 232 so as to pivot the wishbone guideblock 238 away from the poultry carcasses as the poultry carcasses engage and ride upwardly thereover as the cutting blades cut into the poultry carcasses adjacent the wishbones thereof. A rearwardly projecting guide rod or finger 281 extends through the support bracket 233 and is attached to the support yoke 254 of the cutting blades 252 and 253. The guide finger 281 is received through an opening 282 formed in the L-shaped support arm 239. As the wishbone guideblock is pivoted rearwardly away from the poultry carcasses, the guide finger 281 of the cutting blade support yoke is engaged and urged downwardly by the L-shaped support arm so as to urge the cutting blades downwardly and inwardly simultaneously with the rearward pivoting movement of the wishbone guideblock. As a result, the cutting blades are moved downwardly and inwardly along the tapering side surfaces of the wishbone guideblock, so as to cut into the poultry carcasses adjacent and along the wishbones thereof to open and separate the meat of the breasts and backs of the poultry carcasses from the wishbones thereof.

Figure 6:
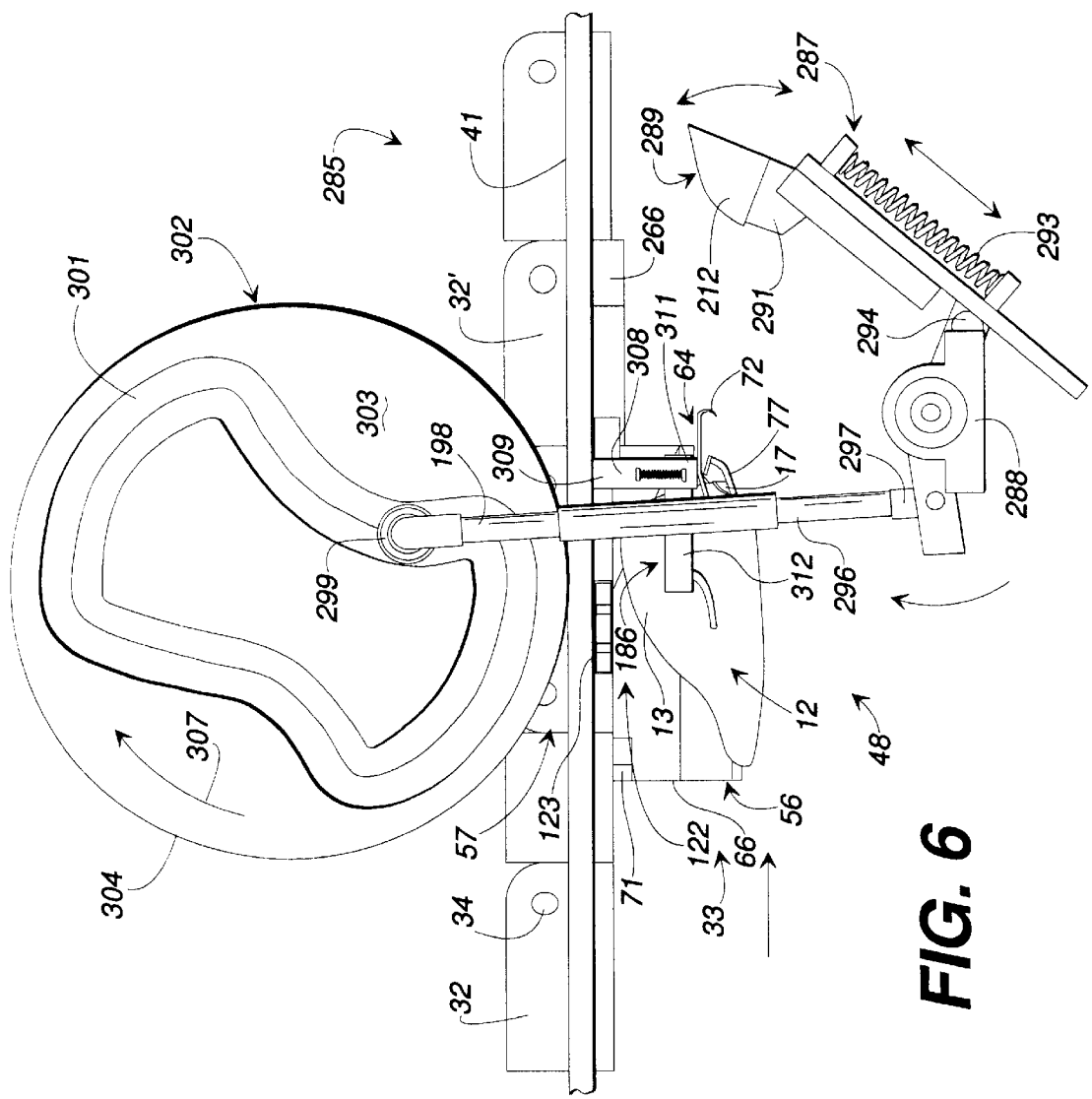
FIG. 6 is a side elevational view of the middle block assembly, illustrating the pivoting motion of the plow blade of the middle block assembly.

As illustrated in FIGS. 1 and 6, the sixth cutting station, comprising a middle block assembly 285, is positioned downstream from the wishbone cutter 230. The middle block assembly includes a pair of side blocks 286 and a bottom block 287 mounted on a rotatable axle or shaft 288. The bottom block further includes a slotted plow blade 289 slidably mounted to a blade support block 291. The slotted plow blade 289 generally is comprised of a pair of spaced curved cutting blades 292 defining a recess therebetween of a width sufficient to enable the keel bones of the poultry carcasses to pass between the cutting blades. The curved configurations of the cutting blades 292 generally correspond to the shape of the breast and keel bones of the poultry carcasses to enable the cutting blades to closely cut and follow along the breast bone and keel bone of the carcasses to separate the meat therefrom. As FIG. 6 illustrates, a compression spring 293 is mounted to the blade support block 291 and is attached to the slotted plow blade 289. The compression spring biases the plow blade upwardly with respect to the support block to the position illustrated in FIG. 6. As the plow blade cuts into and rides along the poultry carcasses, the plow blade can be moved downwardly against the bias of the spring 293 to prevent the plow blade from gouging or splintering the bones of the skeletal structures of the poultry carcasses.

A bracket 294 is mounted to the axle 288 opposite the blade support block 291 and is pivotally mounted at its opposite end to a cam linkage 296. The cam linkage 296 includes a first end 297 that is pivotally attached to the bracket 294, and a second end 298 having a cam roller 299 attached thereto. The cam roller 299 engages and rides along a cam track 301 formed in a large rotating guide wheel 302 that is rotatably mounted to the framework 22 of the breast filleting apparatus. The guide wheel 302 generally is formed from a pair of substantially circular discs 303 and 304 mounted back-to-back. The cam track 301 is formed in the outwardly facing side surface of disc 303, generally being formed in a substantially hour-glass configuration along which the cam roller 299 moves as the guide wheel is rotated. The second disc 304 generally is a large rotating sprocket similar to conveyor sprockets 37 and 38 (FIG. 1) and has a series of recesses or gaps 306 formed about its circumference. These recesses receive the pusher pins 34 (FIG. 6) of the spacer blocks and mandrels to cause disc 304, and thus disc 303, to rotate in the direction of arrow 307 in timed relation with the movement of the conveyor along its lower run. As the guide wheel is rotated in the direction of arrow 307, the cam linkage is raised and lowered as its cam roller rolls along the cam track. As a result, the bracket is pivoted upwardly and downwardly and in response, the axle 288 is rotated, causing the bottom block 287 to pivoted upwardly and downwardly into and out of the processing path of the poultry carcasses in timed relation with the movement of the poultry carcasses along the lower run of the conveyor.

Each side block assembly 286 has a substantially mirror construction of the other and each includes a support block 308 pivotally mounted to the framework of the breast filleting apparatus and having an upper end 309 and a lower end 311. A tension spring 312 is attached to the framework and to the lower end 311 of each support block 308 and tends to bias the lower ends outwardly, away from the processing path of the mandrels, causing the upper ends 309 of the support blocks to be tilted toward the processing path into a position to be engaged by the cam blocks 166 mounted to spacer blocks 32'. The engagement of the upper ends of the support blocks by cam blocks 166 urges the upper ends 309 of the support blocks 308 outwardly and the lower ends 311 inwardly toward the mandrels. Presser plates 312 are mounted to interior surfaces of the support blocks, arranged so as to engage the poultry carcasses as a result of the engagement of the support blocks with the cam blocks 166 of the spacer blocks 32'. The presser plates tend to laterally compress the wishbones or clavicles of the carcasses so that the wishbones will pass between the cutting blades 292 of the slotted plow blade, with the keel bones of the carcasses passing through the slot defined between the cutting blades to prevent the cutting blades 292 from engaging and gouging the bones. Once the carcasses initially are engaged by the plow blade, the cam blocks of the spacer blocks will tend to move pass the support blocks of the side block assembly, causing the presser plates to be moved out of engagement with the carcasses to avoid interfering with the cutting of the carcasses by the plow blade.

Figure 7:
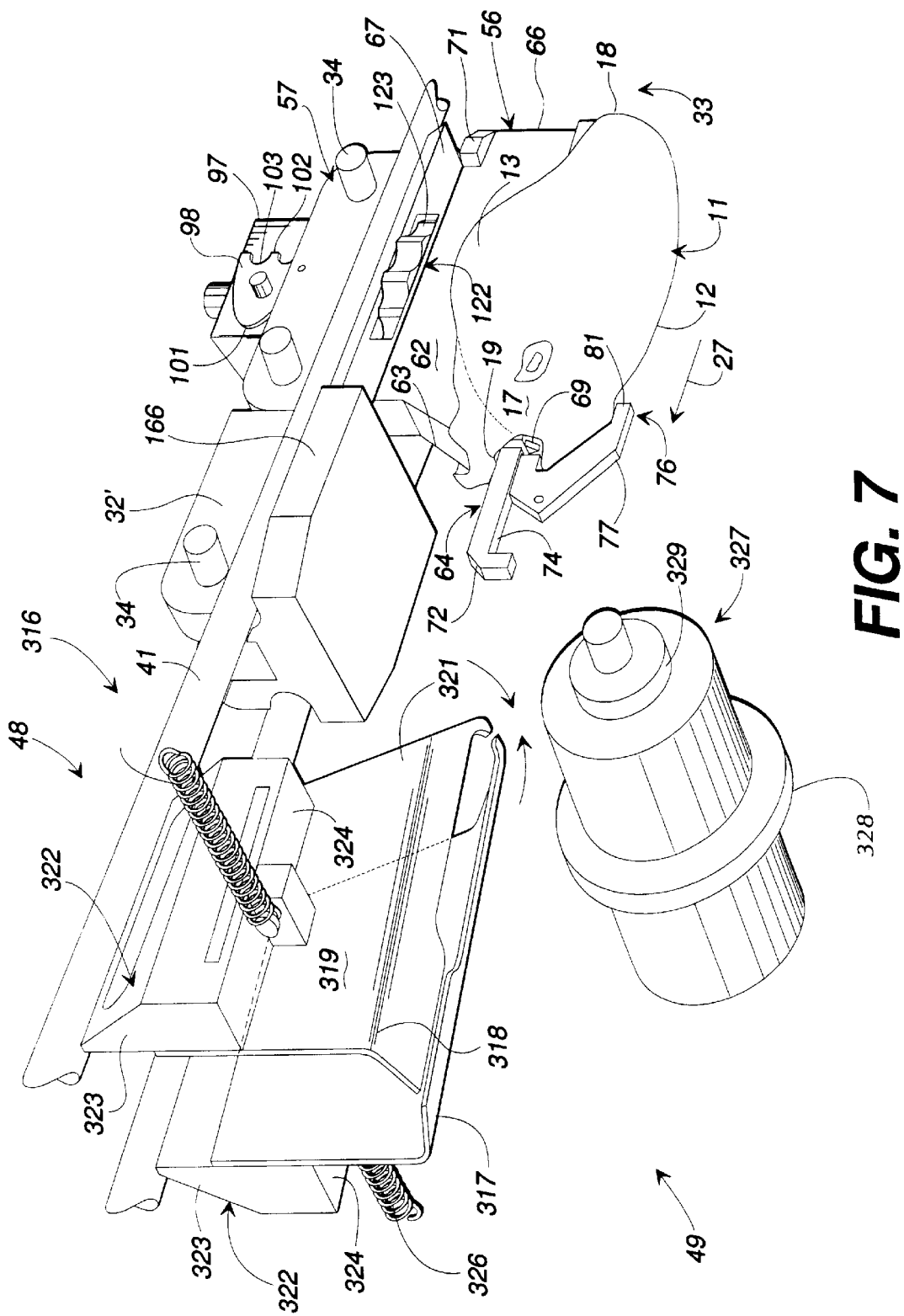
FIG. 7 is a perspective illustration of the fillet tunnel blades and how the mandrels pass therethrough.

As FIG. 1 illustrates, a sixth processing station 49, comprising a fillet tunnel assembly 316, is positioned immediately downstream from the middle block assembly 285 in the path of travel of the mandrels along their processing path. As shown in FIG. 7, the fillet tunnel assembly 316 includes a pair of tunnel blades 317 and 318, having reversed, complimentary shape. Each tunnel blade generally is substantially L-shaped and includes a side wall 319 and a tapered inwardly facing front edge 321. Each tunnel plate is supported by a support plate 322 that is pivotally attached to the framework of the breast filleting apparatus and which includes an upper end 323 positioned so as to be engaged by the cam blocks of the spacer blocks 32', and a lower end 324 to which a tension spring 326 is mounted. The springs 326 tend to urge the lower ends of the support plates outwardly, causing the tunnel plates ordinarily to be spread outwardly out of the processing path of the birds. The support plates function as levers for pivoting the tunnel blades inwardly toward each as the cam block 166 of spacer blocks 32' engage the upper ends 326 of the support plates. When the tunnel blades 317 and 318 move toward each other to the position shown in FIG. 7, the spacing of the side walls of the tunnel blades is such that the skeletal structures of the carcasses just fits within the side walls so that the front edges 321 of the tunnel blades tend to cut into the carcasses adjacent the skeletal structures so as to complete the cutting and scraping away of the meat of the breast and adjacent back portions of the poultry carcasses from the skeletal structures thereof.

As further illustrated in FIGS. 1 and 7, a fillet splitter 327 is mounted below the tunnel assembly 316. The fillet splitter 327 (FIG. 7) comprises a pair of circular cutting blades or discs 328 mounted on a rotatable shaft 329, spaced from each other. The fillet splitter is movable vertically into and out of the processing path of the poultry carcasses. With the fillet splitter in its raised position, the cutting blades of the fillet splitter engage the meat of the carcasses as the meat is cut from the skeletal structures of the carcasses to separate the meat into separate portions.

Figure 8:
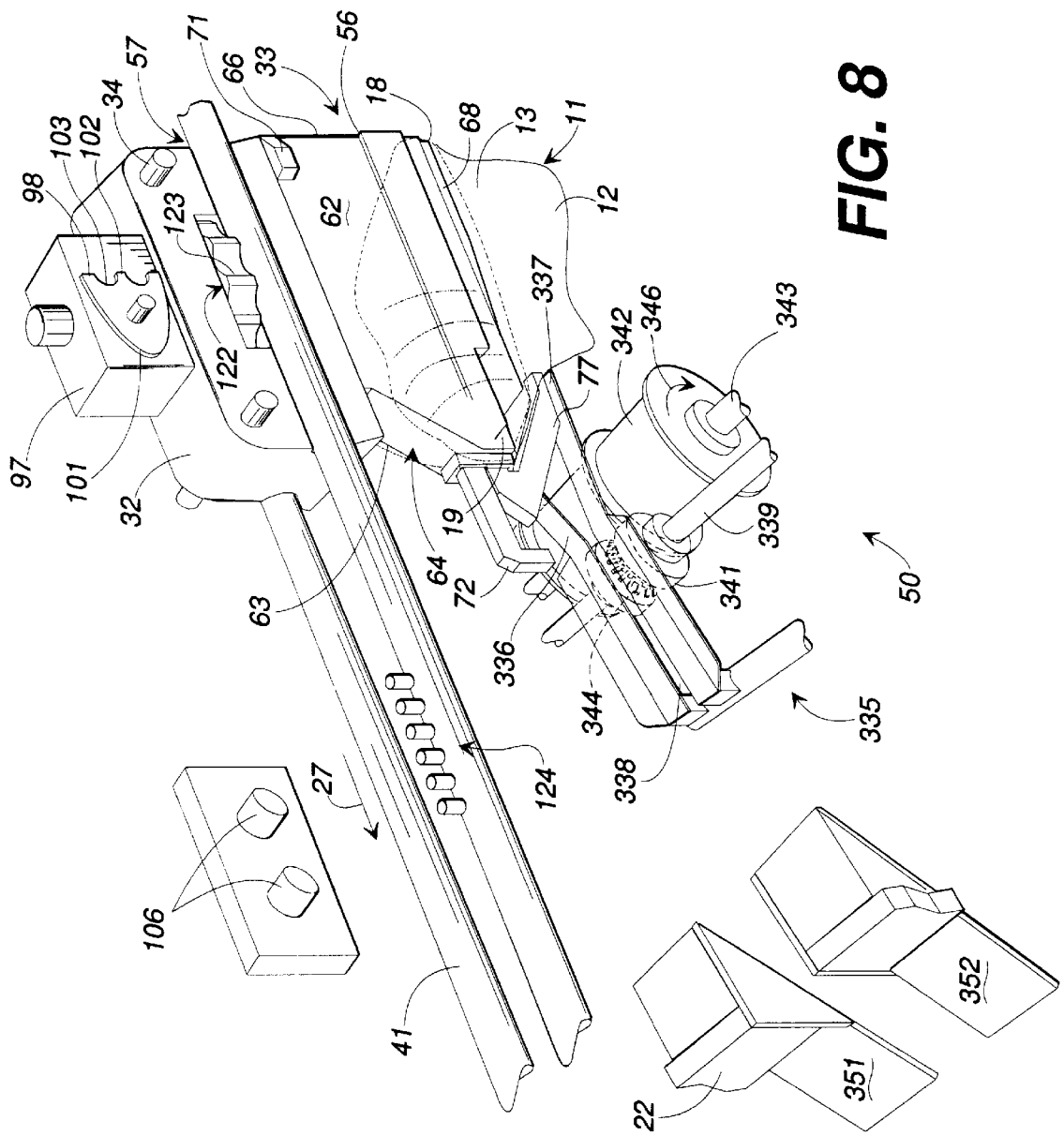
FIG. 8 is a perspective view illustrating the fillet removing means and the second cam plate and stripper blades for dislodging the skeletal structures of the poultry carcasses after the fillets have been removed therefrom.

As shown in FIGS. 1 and 8, a seventh processing station 50 comprises a fillet remover assembly 335 positioned further along the processing path 27 of the poultry carcasses, immediately downstream from the fillet tunnel assembly. The fillet remover assembly 335 includes a pair of spaced fenders 336 and 337 that define a slot 338 therebetween. The fenders are mounted to and supported at one end on a stationary support rod 339 and project rearwardly along the processing path from the support rod 339. The fenders 336 and 337 diverge away from each other toward their rearward ends so as to form a wedge shape at this portion of the slot. The fillet remover further includes a pair of fillet remover gears 341 and a remover roll 342 positioned in a staggered relationship below the fenders 336 and 337. The fillet remover gears 341 are mounted on a common shaft 343 in an opposed, parallel relationship and each include a series of spaced teeth 344. The gears rotate in the direction indicated by arrow 346 such that the rearward facing surfaces of the gears rotate downwardly with respect to the oncoming mandrel and poultry carcass. Likewise, fillet remover roll 342 is mounted to and rotates on a shaft 347 in the direction indicated by arrow 348 so that its rearwardly facing surface rotates in a downward direction with respect to the oncoming mandrel and poultry carcass for stripping the meat from the skeletal structures, which drops downwardly through the apparatus for collection for further processing.

As shown in FIG. 1, a third set of turning projections 124 along the processing path immediately downstream from the filet remover. The turning projections are engaged by the teeth of the turning sprockets which causes the body portions of the mandrels to be rotated and reoriented approximately 180 degrees so that the tails of the poultry carcasses are leading and their neck openings trailing. Immediately thereafter, the cam followers 98 of the cam actuator means 87 of the mandrels 33 engage the second set of cam pins 106 positioned at the distal end 24 (FIG. 1) of the breast filleting apparatus 10. As a result, the cam followers are caused to rotate in the direction of arrows 107' (FIGS. 2A and 2B) to cause the clamp tool of each mandrel to unclamp from the skeletal structures of the poultry carcasses and be moved rearwardly to their unclamped, nonengaging positions.

As FIGS. 1 and 8 illustrate, a pair of stationary stripper blades 351 and 352 are mounted to the framework, positioned along on the processing path. The stripper blades generally comprise substantially triangularly shaped plates spaced apart a distance slightly greater than the width of the mandrels so that the mandrels can pass therebetween. The skeletal structures of the carcasses 11, however, are engaged by the stripper blades 351 and 352, which tend to urge the carcasses downwardly and off of the mandrel for removal of the skeletal structures therefrom. The skeletal structures are allowed to drop downwardly through the framework to a collection means (not shown) while the mandrels proceed along the conveyor and are inverted into their upright attitude for receiving new poultry carcasses for processing. As the mandrels proceed along the upper run 28 (FIG. 1) of the processing path 27, their turning sprockets engage a fourth set of turning projections, which causes the rotation of the mandrels so that their nose portions are leading as they enter the loading area.

OPERATION

In operation of the breast filleting apparatus 10 (FIG. 1), an operator (not shown) mounts previously eviscerated poultry carcasses 11 on a series of mandrels 32, with the interior cavities defined by the skeletal structures of the poultry carcasses receiving the body portions 57 of the mandrels and the nose portions 64 of the mandrels projecting through the neck openings of the poultry carcasses. The loaded mandrels are moved along the upper run 28 of a processing path 27 by a conveyor 26. As the carcasses begin their movement along their processing path, a cam follower 98 (FIGS. 2A and 2B), mounted to the base portion 56 of each mandrel engages a first set of cam pins 104 (FIG. 1), which cause the cam follower to rotate. As the cam follower rotates, an internal sprocket or gear 99 (FIGS. 2A and 2B) mounted thereto rotates in engagement with a lower toothed portion 92 of a rack 88 extending through the base and body portions of each mandrel. This causes the rack to be moved in the direction of arrow 96, in response to which the clamp tool 77 of each mandrel is moved rearwardly toward the poultry carcasses into a clamped, engaging position. The clamp tools engage the breasts of the poultry carcasses in tight bearing engagement to lock the poultry carcasses securely and automatically in place. Following the clamping of the poultry carcasses against their mandrels, the mandrels are moved past a first series of turning projections 124 which are rotated 180 degrees to reorient the poultry carcasses so that their tails are leading as the poultry carcasses enter a first processing station 42, comprising a wing cutter 131.

As the poultry carcasses enter the wing cutter, the wings 16 of the carcasses engages and slide between guide rails 142 and 143. The guide rails lift and urge the wings toward the breasts of the carcasses to open the tops of the shoulder joints of the wings and stretch the tendons, leaders, etc. at the shoulder joints. At approximately the same time, cams 71 mounted to the sides of the mandrels engage cam protrusions 139 of each successive cutting blade assembly 132, 133 and 134. This engagement causes the cutting blades 136 of each cutting blade assembly to be pivoted into the processing path of the carcasses into position approximately aligned with the shoulders of the carcasses. The cutting blades cut into the shoulder joints, with the cutting blades of each successive cutting blade assembly cutting progressively deeper through the shoulder joints to separate the tendons, leaders, etc. across the tops of the shoulders to begin the removal of the wings.

Thereafter, the poultry carcasses are inverted with their breasts facing downwardly and begin to move along the lower run 29 of their processing path where they are engaged by a wing remover 151 mounted within the processing path of the poultry carcasses. As the poultry carcasses enter the wing remover, their wings are engaged and slide along pairs of spaced guide rods 156 and 157, which cause the wings to be spread outwardly to open and align the shoulder joints with a pair of rotary disc cutting blades 152. Cam blocks 166 mounted to the spacer blocks 32' immediately proceeding each mandrel 33 engage cam protrusions 164 mounted to pivot arms 162, positioned upstream from and slightly above the rotary disc cutting blades. The engagement of the protrusions 164 by cam blocks 166 causes the carcass support plates 158 to be pivoted inwardly toward engagement with the meat of the breasts and backs of the poultry carcasses so that the meat is pressed inwardly against the sides of the mandrel to avoid engagement of the meat by the rotary disc cutting blades. The rotary disc cutting blades engage and cut through the opened shoulder joints between the wings and shoulders of the poultry carcasses as the poultry carcasses are moved through the wing remover to complete the removal of the wings therefrom. The wings thereafter are permitted to drop through the apparatus to a collection means below as the poultry carcasses continue to move along their processing path.

After the removal of the wings from the poultry carcasses, the poultry carcasses are moved into engagement with a skinner 175 in which the skin of the carcasses is engaged and pulled between the meshing teeth 178 (FIG. 4) of a pair of skinning rolls. The skinner is pivotally mounted to the support frame of the breast filleting apparatus and is pivoted toward and away from the processing path in the direction of arrows 176 and 176' timed relationship with the movement of the poultry carcasses therealong. Typically, as the poultry carcasses enter the skinner, the upstream end of the skinner is raised into engagement with the poultry carcasses. As the larger, fattier portions of the poultry carcasses enter and move between the skinning rolls, the upstream end of the skinner is pivoted downwardly as its downstream end is pivoted upwardly toward the carcasses in order to maintain the skinning rolls in tight scraping engagement with the poultry carcasses to remove the skin therefrom.

Following the removal of the skin from the poultry carcasses, the poultry carcasses are engaged by a membrane remover 200 positioned immediately downstream from the skinner 175. The membrane remover includes a pair of rotating remover rolls 204 that engage the membrane or second skin of the poultry carcasses and strip the membranes therefrom. The membrane remover is tilted toward and away from the processing path of the poultry carcasses in timed relationship with the movement of the poultry carcasses therealong. The upstream end 221 of the membrane remover generally is tilted downwardly as the poultry carcasses enter the membrane remover, to enable easy movement or passage of the poultry carcasses into the membrane remover, and the membrane remover is progressively tilted so that its upstream end is pivoted toward the processing path while its downstream end 221 is pivoted away from the processing path as the carcasses pass thereover to maintain tight contact between the membrane rolls and membranes of the carcasses.

Thereafter, as illustrated in FIGS. 1 and 5, turning sprockets 122 of the mandrels 33 engage a second set of turning projections 124 mounted along the processing path, which cause the rotation of the mandrels to reorient the poultry carcasses with the neck openings and shoulders of the poultry carcasses leading as the poultry carcasses approach the fifth processing station 47, which comprises the wishbone cutting assembly 230 (FIG. 5). Prior to entering the wishbone cutting assembly, the poultry carcasses are engaged by a pair of stationary cutting blades 225 and 226. The stationary cutting blades cut into and separate the scapular meat from the shoulder blades of the poultry carcasses. The poultry carcasses then move into the wishbone cutting assembly 230.

As the poultry carcasses enter the wishbone cutting assembly, the assembly frame 231 of the wishbone cutting assembly is rotated upwardly toward the poultry carcasses by the movement of a first cam roller 267 along a first cam track 264 formed in cam wheel 260 mounted above the wishbone cutting assembly. A wishbone guideblock 238 is pivoted into engagement with the poultry carcasses so that as the poultry carcasses continue to move along their processing path, their wishbones 21 (shown in dashed lines) engage and ride along a guide recess 249 formed in the top surface 248 of the wishbone guideblock, which aligns and stabilizes the wishbones for cutting. As the wishbones ride along the top surface of the wishbone guideblock, a pair of cutting blades 252 and 253 engage and cut into the poultry carcasses immediately adjacent the wishbones.

Approximately at the same time, the wishbone guideblock is pivoted downwardly in the direction of arrows 242' by the movement of a second cam roller 273 along a second cam track 266 formed in the cam wheel 260. This causes the downward movement of a cam linkage 269 so as to urge the L-shaped support arm 239 of the wishbone guideblock to pivot the wishbone guideblock away from the poultry carcasses. As the wishbone guideblock pivots away from the processing path, a guide finger 281 attached to the support yoke 254 for the cutting blades 252 and 253 is engaged and urged downwardly by the L-shaped support arm, which causes the cutting blades to be moved downwardly and inwardly along the tapering side surfaces 246 and 247 of the wishbone guideblock. The cutting blades accordingly cut into and along the wishbones to separate the meat of the poultry carcasses from the wishbones.

As shown in FIGS. 1 and 6, following the cutting of the meat from about the wishbones of the poultry carcasses, the poultry carcasses are engaged a middle block assembly 285. As the poultry carcasses enter the middle block assembly, the cam blocks 166 (FIG. 6) of the spacer blocks 32' engage the upper ends 309 of support blocks 308 causing the lower end of the support blocks to be pivoted inwardly, so as to move presser plates 312 into engagement with the sides of the poultry carcasses. The engagement of the poultry carcasses by the presser plates tends to lift the meat of the poultry carcasses and align the skeletal structures of the carcasses with the cutting blades 292 of a slotted plow blade 289 that is pivoted upwardly toward engagement with the poultry carcasses in timed relation with the movement of the poultry carcasses through the middle block assembly. The cutting blades 292 engage and cut along the rib bones of the skeletal structures of the poultry carcasses. The slotted plow blade is biased downwardly along its plate support block 87 against the force of spring 293 by the forward movement of the poultry carcasses along the conveyor. As a result, the slotted plow blade tends to ride along and closely match the shape of the rib cage of the skeletal structures of the poultry carcasses adjacent the keel bones thereof, with the keel bones passing through the slot formed between the cutting blades of the slotted plow blade as the bearing of the carcasses against the plow blade urges the plow blade downwardly against the compression spring 293. As a result, the meat of the carcasses can be cut from the bones of the skeletal structures with the danger of the bones being engaged or gouged by the cutting blades minimized.

As FIG. 7 illustrates, the poultry carcasses next are carried into engagement with a fillet tunnel assembly 316 in which the tunnel blades 317 and 318 thereof are pivoted into a cutting position within the processing path 27 of the poultry carcasses by the engagement of support plates 322 by the cam blocks 166 of spacer blocks 32'. The shape and configuration of the tunnel blades approximately matches the configuration of the skeletal structures of the poultry carcasses such that the tunnel blades tend to cut into the meat of the poultry carcasses adjacent the bones of the skeletal structures thereof. The tunnel blades scrape along the bones of the skeletal structures to scrape the meat from the skeletal structures of the poultry carcasses, leaving the meat hanging downwardly, attached to the skeletal structures only along the keel bone thereof.

After the stripping of the meat of the breasts and back portions 12 and 13 from the skeletal structures of the poultry carcasses 11, the poultry carcasses are carried, with the meat hanging downwardly therefrom, into engagement with a fillet remover 335 (FIG. 8). When a mandrel 33 approaches the fillet remover, a substantial amount of the meat will have been removed from the skeletal structure supported on the mandrel and will be hanging downwardly from the mandrel. The downwardly hanging portion of the meat will pass beneath the fillet remover and become engaged by the rearwardly moving facing surfaces of the fillet remover roll, which tends to apply a downward and rearward force to the oncoming meat, tending to pull the meat away from the skeletal structure of each carcass 11. Further, the fenders of the fillet remover tend to further guide the clinging portion of the meat toward the slot so that further friction is applied by the fenders to the meat. The keel bone tends to pass through the slot between the fenders and the teeth 344 of the gears 341, which tend to brush against the keel bone and remove the fleece from the breast and keel bone. The additional friction applied by the fenders and the teeth of the gears tends to strip any remaining portions of the meat from the skeletal structures of the carcasses mandrel and the meat tends to drop in a downward direction away from the mandrel, while the skeletal structures of the carcasses tend to remain on the mandrels.

With the fillets of meat having been stripped away from the skeletal structures of the poultry carcasses, the mandrels are carried further forwardly into engagement with a third series of turning protrusions 124 which are engaged by the turning sprockets 122 of the mandrels, causing the mandrels to rotate 180° so that their rear portions are leading. The cam followers of the mandrels thereafter engage a second set of cam pins 106 that cause the clamp tools of the mandrels to be released from clamping engagement with the carcasses. Thereafter, the skeletal structures of the poultry carcasses engage stripper blades 351 and 352, which tend to urge the skeletal structures downwardly and off of the mandrels for collection and removal. The mandrels, thus cleared of the skeletal structures of the poultry carcasses, pass about conveyor sprockets 37' and 38' (FIG. 1) and are reoriented into their upright position for loading with additional poultry carcasses as the mandrels continue along their processing path.

It will be understood by those skilled in the art that the foregoing invention has been described in relation to a preferred embodiment thereof, and that many modifications, additions and deletions may be made thereto without departing from the spirit and scope of the invention as set forth in the following claims.

We claim:

1. A mandrel for mounting to a conveyor for carrying an eviscerated poultry carcass along a processing path through a filleting process in which the meat of the carcass is removed from the skeleton of the carcass, said mandrel comprising:
    a base portion for mounting to a conveyor;
    a body portion pivotally mounted to said base portion, said body portion sized and shaped to receive thereabout the visceral cavity of the breast of a poultry carcass, for supporting a breast on the mandrel;
    means for turning said body portion of said mandrel with respect to said base portion between a forward facing position and a rearward facing position in response to said mandrel moving past a turning element adjacent the conveyor;
    movable carcass clamp means mounted to said body portion sized and positioned for grasping the breast of the poultry carcass for holding the breast on the body portion of the mandrel; and,
    clamp actuator means extending through said base portion and said body portion including a cam follower for actuating said movable carcass clamp means while the body portion is positioned in either the forward facing position or the rearward facing position.

2. The mandrel of claim 1 wherein said clamp actuator means is further defined as having a rod means, said rod means extending through said base portion and said body portion such that said body portion is pivotable about said rod means, said rod means further engaging said cam follower.

3. The mandrel of claim 2 wherein said clamp actuator means is further defined as having a gear assembly mounted to said body portion and engaging said rod means.

4. The mandrel of claim 3 wherein
    said body portion is further defined as having a sliding support bar slidingly mounted thereon incorporating a toothed portion, said toothed portion arranged and adapted to engage said gear assembly such that rotation of said gear assembly causes the sliding support bar to slide relative to said body portion, thereby adjusting the position of said movable carcass clamp means between a clamped engaging position and an unclamped non-engaging position.

5. The mandrel of claim 2 and wherein said means for turning said body portion with respect to said base portion comprises a turning sprocket mounted to said body portion, said turning sprocket surrounding said rod means and having teeth extending laterally beyond said body portion for engaging and being turned by stationary pin members positioned along the processing path.

6. A filleting system for removing meat from the skeletal portions of the carcasses of previously eviscerated poultry comprising:
    a continuous transport conveyor;
    a plurality of carcass support mandrels positioned in series along said transport conveyor and movable with said transport conveyor through a processing path;
    said carcass support mandrels each comprising:
        a base portion carried by said transport conveyor;
        a body portion pivotally mounted to said base portion for receiving a poultry carcass and for carrying a poultry carcass through the processing path;

turning means mounted to said body portion for turning said body portion with respect to said base portion in response to moving said mandrel past stationary turning elements adjacent said conveyor for changing the orientation of said body portion and a carcass mounted thereon between a forwardly facing direction and a rearwardly facing direction;

movable carcass clamp means mounted to said body portion sized and positioned for grasping a carcass carried by said body portion; and clamp actuator means extending through said base portion to said body portion, said clamp actuator means including rod means and a cam follower, said cam follower mounted on said base portion for actuating said rod means and said movable carcass clamp means when said body portion is facing either its forwardly or rearwardly facing direction, said rod means extending through said base portion and said body portion such that said body portion is pivotable about said rod means.

7. The filleting system of claim 6 and further including a series of processing stations mounted along said processing path through which the carcasses are conveyed for removing the meat therefrom.

8. The filleting system of claim 7 and wherein said processing stations include means for skinning the carcasses and means for filleting and removing the meat of the carcasses.

9. The filleting system of claim 6 and wherein said means for turning said body portion comprises a turning sprocket mounted to said body portion and surrounding a portion of said clamp actuator means and having a series of teeth that project radially outwardly from said body portion for engaging said turning elements which are mounted in sets at spaced intervals along said processing path for reorienting the carcasses for various processing operations.

10. The filleting system of claim 6 and wherein said movable carcass clamp means includes a hooked clamp tool that is automatically movable between a lowered, non-engaging position and a clamped, engaging position upon engagement of said clamp actuator means for securing a carcass against its mandrel.

* * * * *